United States Patent [19]

Bouyoucos

[11] 4,153,135

[45] May 8, 1979

[54] APPARATUS FOR THE GENERATION OF ACOUSTIC SIGNALS IN MARINE ENVIRONMENTS

[75] Inventor: John V. Bouyoucos, Rochester, N.Y.

[73] Assignee: Hydroacoustics Inc., Rochester, N.Y.

[21] Appl. No.: 838,415

[22] Filed: Sep. 30, 1977

[51] Int. Cl.² .......................... G01V 1/04; G01V 1/38
[52] U.S. Cl. ................................. 181/120; 340/12 R
[58] Field of Search .................... 181/110, 120; 340/9, 340/12 R; 175/1; 73/665; 173/116; 91/321

[56] References Cited

U.S. PATENT DOCUMENTS

| | | | |
|---|---|---|---|
| 3,392,369 | 7/1968 | Dickie et al. | 181/120 |
| 3,564,492 | 2/1971 | Magneville et al. | 340/12 R |
| 3,676,840 | 7/1972 | Bays | 340/12 R |
| 3,679,021 | 7/1972 | Goldberg | 181/120 |
| 3,896,889 | 7/1975 | Bouyoucos | 175/56 |
| 3,978,940 | 9/1976 | Bouyoucos | 340/12 R |
| 4,016,952 | 4/1977 | Reed et al. | 181/110 |

Primary Examiner—Nelson Moskowitz
Attorney, Agent, or Firm—Martin LuKacher

[57] ABSTRACT

A source is described capable of generating acoustic signals under water at high cycling rates suitable for providing seismic signals of controlled amplitude and spectral shape and with precise timing for geophysical exploration. The source has a pair of radiating pistons in a housing having a cylindrical sleeve and radial webs. Axial shafts extend outwardly from the pistons and support the pistons in the webs. The peripheral edges of the pistons are in sliding contact with and are guided by the sleeve. The pistons and sleeve define a chamber between the pistons which, under quiescent conditions, contains gas under a low pressure or partial vacuum. The shaft on at least one of the pistons extends into another chamber in the hub of one of the webs. Pressurized hydraulic fluid is caused to flow into this chamber via a valve mechanism to cause the pistons to execute cycles in which they move toward each other to an impact position, due to the ambient pressure of the surrounding water, and then rebound away from each other by virtue of a mass-spring system which is defined by the pistons and may also include the compressed gas in the chamber between the pistons which cushions the impact and shapes the acoustic signal. A control system, which may be responsive to the acoustic signal in the water, detects when the pistons reach impact position, and provides for the timing and duration of the cycle to be precisely controlled, with acoustic signals of desired amplitude being produced precisely at the desired times and with the pistons being reset in their outward position ready for the next cycle in a minimum time and without unwanted acoustic transients such that the acoustic signals can be generated at high cycling rates. The source is suitable for use in arrays where any individual source provides transmitted signals which are timed to occur simultaneously or sequentially in relation to the signals provided by the other sources.

41 Claims, 20 Drawing Figures

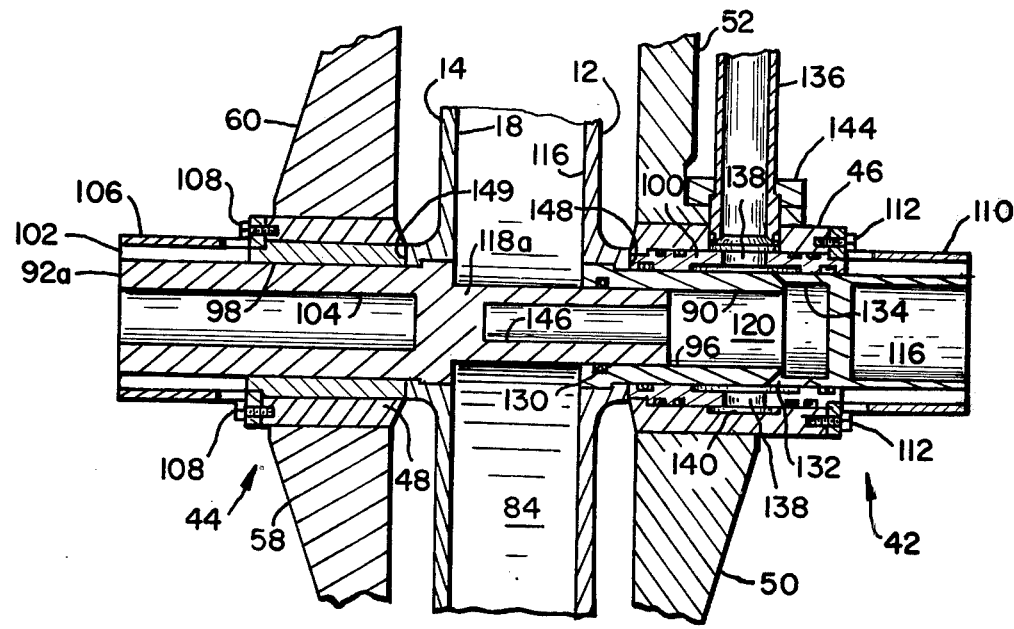
FIG. 4
FIG. 5
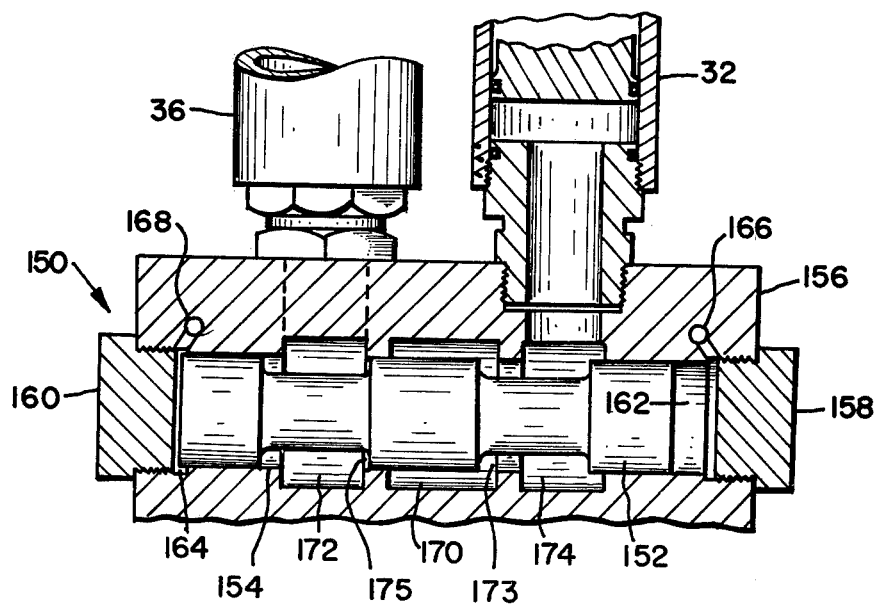

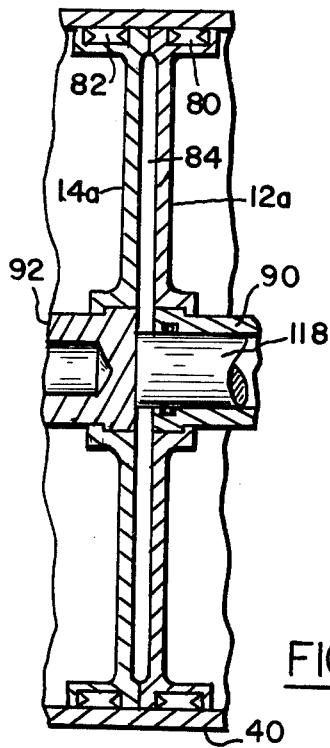
FIG. 9
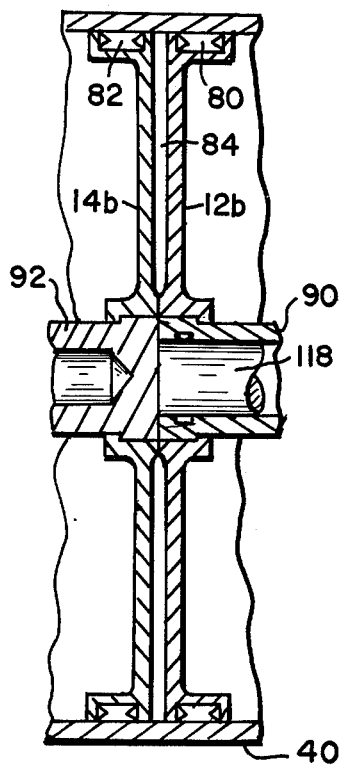
FIG. 10
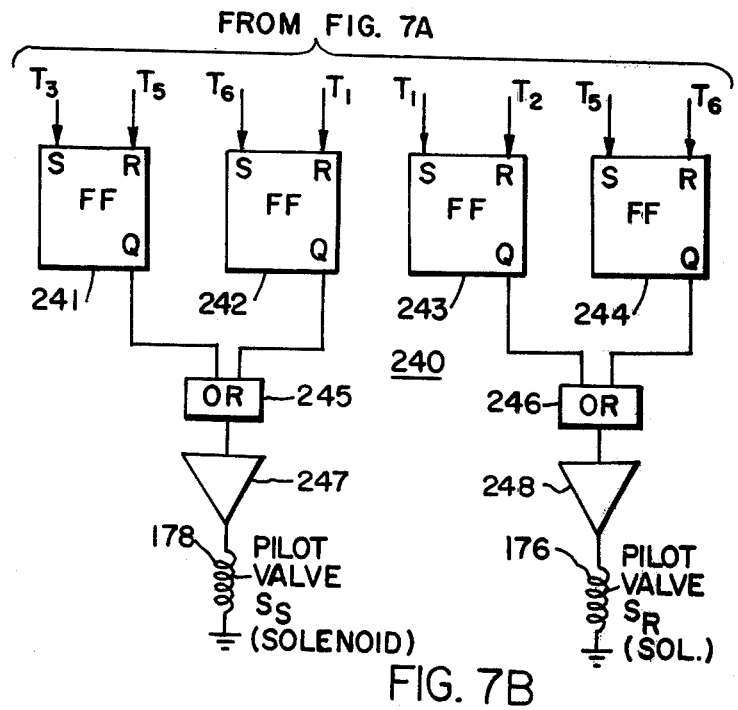
FIG. 7B
FIG. 13
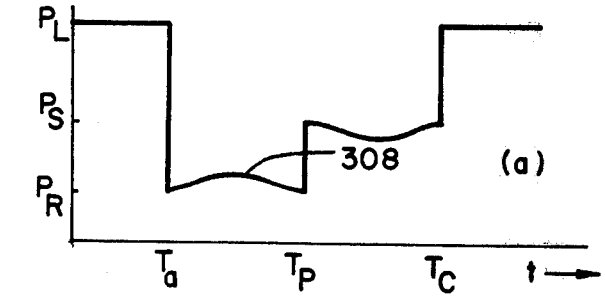
(a)
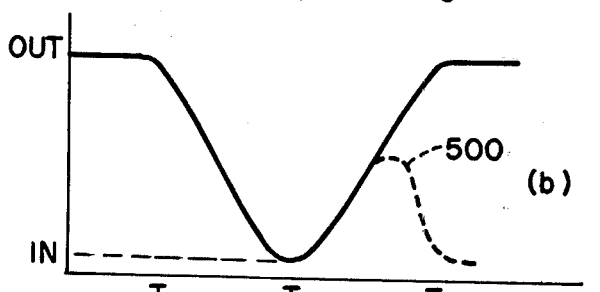
(b)
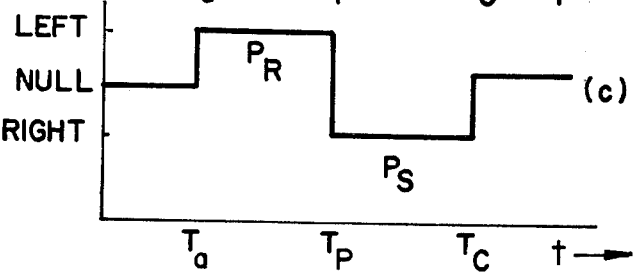
(c)

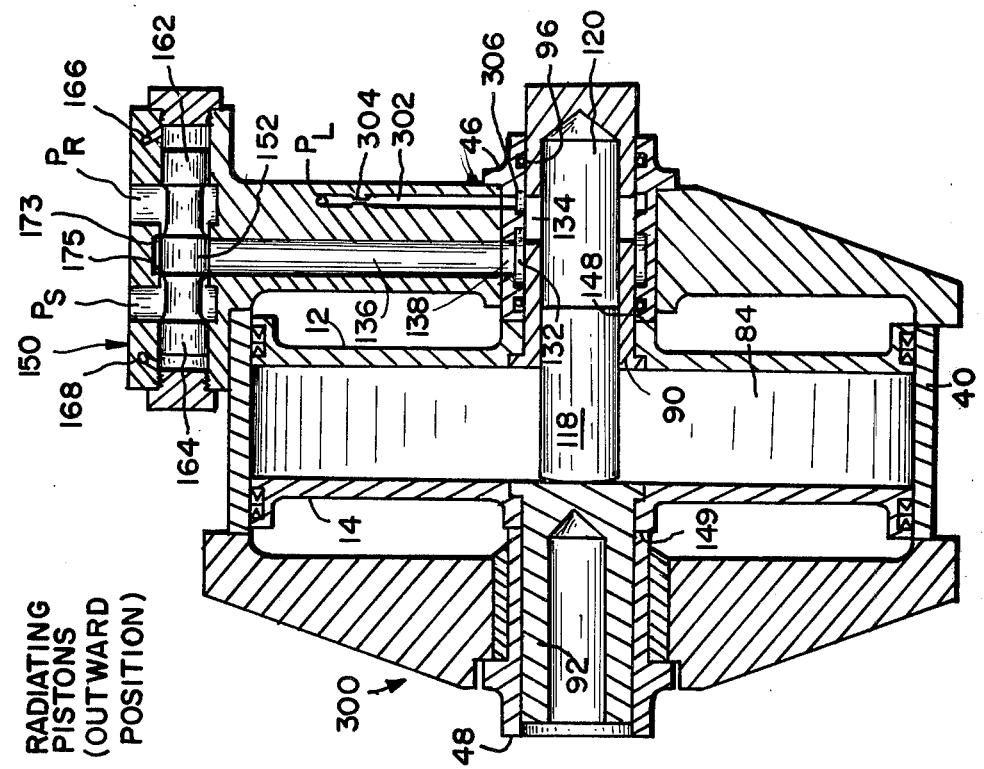
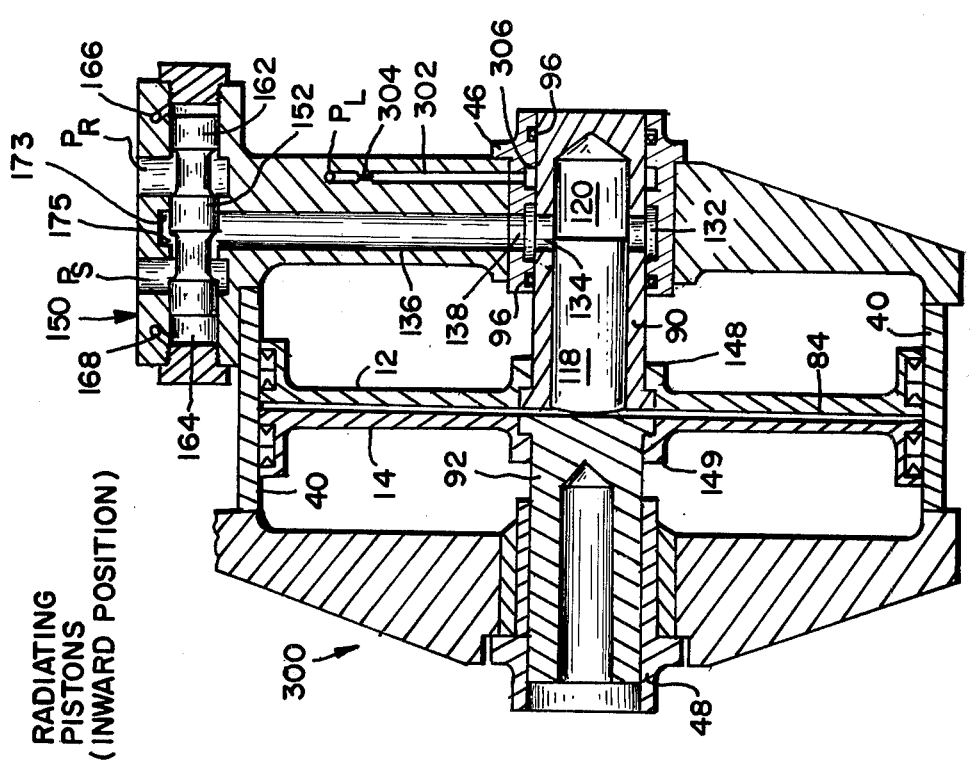

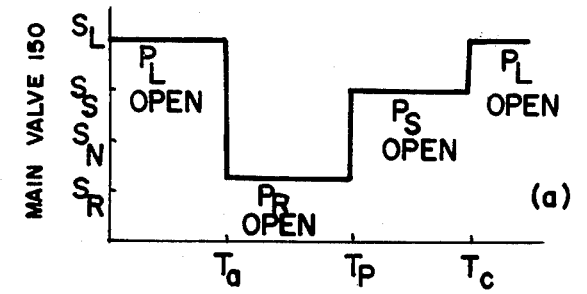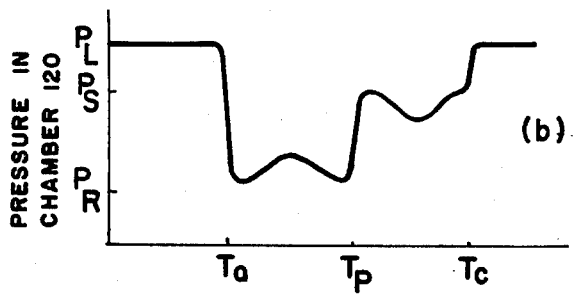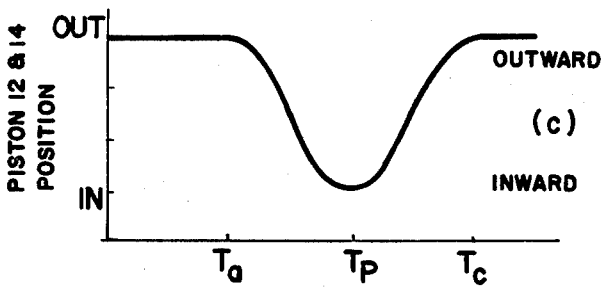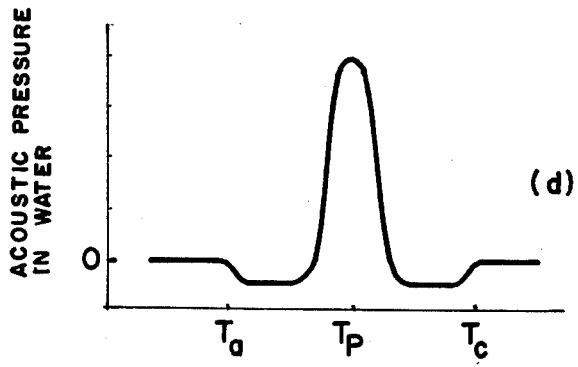
FIG. 18
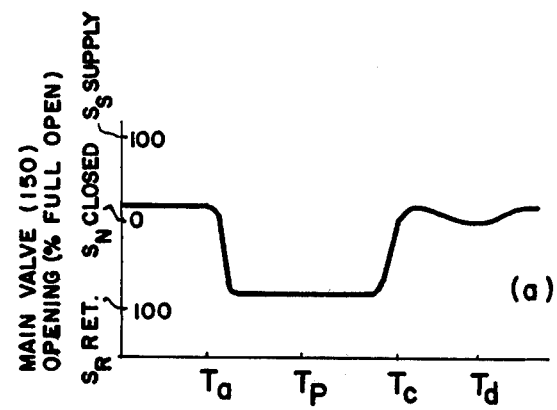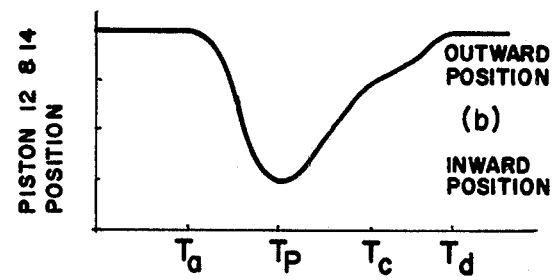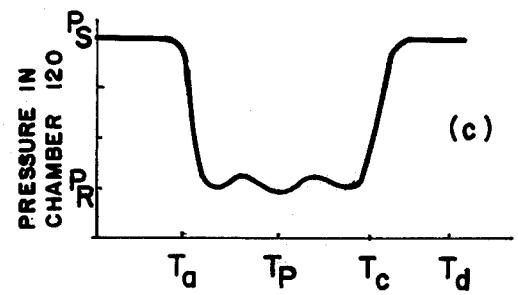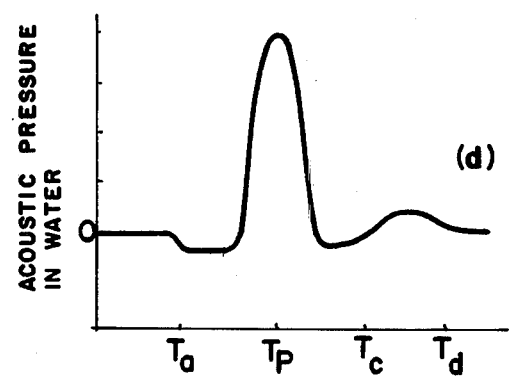
FIG. 19

APPARATUS FOR THE GENERATION OF ACOUSTIC SIGNALS IN MARINE ENVIRONMENTS

The present invention relates to apparatus for producing acoustic signals in marine environments and particularly to a hydroacoustic source for generating sequences of acoustic pulses under water in which the pulses can occur in rapid succession.

The invention is especially suitable for use in a marine seismic signal source for geophysical exploration purposes wherein transmission of a large number of pulses at high cycling rates and with precise timing in accordance with a signal format or code are desired, and also where synchronous operation of a plurality of sources in precise time relationship is needed. Such systems are described in patent application, Ser. No. 730,752, filed Oct. 7, 1976, in the name of John V. Bouyoucos; and in Ser. No. 828,698, filed Aug. 29, 1977, in the name of David E. Nelson, both applications being assigned to the same assignee as the present application.

In U.S. Pat. No. 3,277,437, issued Oct. 4, 1966 to John V. Bouyoucos, an underwater acoustic signal source is described wherein a radiating piston is positioned at the open end of a cylinder in which a partial vacuum is created. When the piston is released, the pressure differential across the piston due to the ambient pressure (the head of the surrounding water) accelerates the piston inwardly to a position where it abruptly stops (i.e., velocity of the piston quickly goes to zero). This position is called an impact position. The pressure of the air remaining in the cylinder increases as the piston accelerates inwardly and can form a spring which cushions the impact and which can cause the piston to rebound. An acoustic pressure pulse in the surrounding water is generated as the piston rushes inwardly to the impact position and is turned around to rebound. The reversal in piston direction characterizes an elastic impact event. The pressure pulse produced is an acoustic signal useful as a seismic signal for echo-location (sonar) and geophysical exploration and other signalling purposes. To generate another pulse, the source must be rearmed which requires additional time. Variations upon the source described in the Bouyoucos Pat. No. 3,277,437 have been numerous and reference may be had to the following patents which show some of such variations: U.S. Pat. Nos. 3,564,492, issued Feb. 16, 1971; 3,610,366, issued Oct. 5, 1971; 3,679,021, issued July 25, 1972; and 3,721,211, issued Mar. 20, 1973.

Such sources as are described in the Bouyoucos Pat. No. 3,277,437 and the variations thereon are well adapted for single pulse operations with low cycling rates. That is, they must be rearmed to set the piston in an outward position against the pressure head of the water prior to being refired to generate another pulse. Also time must be allowed for any transient vibrations which occur as the radiating piston is reset in the outward position against its stops. Accordingly, such sources are limited to operation at low cycling rates of about one or more seconds between firings.

It is necessary, however, in order to obtain improvements in signalling described in the above referenced applications, to generate sequences including many pulses during a transmission interval whose duration may be, say, from four to fifteen seconds, so as to distribute energy at high level uniformly over a desired geophysical interrogation frequency range, such as, for example, from 20 to 100 Hz or 40 to 200 Hz. In such sequences the pulses must be generated at rates averaging 20 to 40 per second with several hundred impact events taking place during a transmission interval. The pulses must be transmitted with precise timing and amplitude and synchronized with pulses from other sources as may be used in an array of sources.

Furthermore, it is important that any uncontrolled acoustic transients that may accompany the rearming of the source following the generation of a pulse be low in amplitude. In particular, it has been found that the amplitude of such uncontrolled pressure transients should be at least 20 dB below the amplitude of the desired pulse in order that correlation noise in the processing of a coded sequence not be objectionable or degrading in the resulting seismogram or other output display.

The acoustic pressure, P(t), of the pulse is a function of the acceleration of the piston and is given by $$P(t) = (PS/4\pi r)(dv/dt) \tag{1}$$

where P is the fluid density, S is the piston area, r is the radial distance from the piston and dv/dt is the piston acceleration. To obtain high amplitude, large pistons (several feet in diameter) are needed which can be provided in accordance with a feature of this invention. The acceleration toward the impact position must be controlled to yield the prescribed amplitude of the acoustic pulses, which is provided in accordance with a feature of the invention. Also, the timing of the impact events must be precisely controlled, which control is also provided in accordance with a feature of the invention. Finally, the duration of the cycle in which the pulses are generated must be controlled and reduced without generation of spurious signals in order to enable the pulses to be produced at rapid cycling rates and which can be swept in repetition frequency. Such duration control and absence of spurious signals is also provided in accordance with a feature of the invention. The pressure differential across the piston (the sea water pressure head) and the mass of the piston determine the acceleration. The acceleration determines the pulse amplitude, and control of the acceleration and pulse amplitude is provided in accordance with a feature of the invention. The shape of the individual pulses determines the width of the spectrum. It is desirable that the shape be the same from pulse to pulse and not be adversely affected by the mechanisms used to arm the source to generate each pulse.

Impulse sources such as described in the above mentioned Bouyoucos patent and variations thereof are subjected to large amplitude shocks as each impulse is generated. Since the source must be submerged for use and then retrieved for maintenance, reliability and repeatability of operation is essential. Sources having housing sections subject to high pressures and resulting forces, such as described in the above referenced Goldberg patents, are oftentimes subject to failures which make them unreliable in operation.

The principal object of the present invention is, therefore, to provide an improved source of impact events for use in marine environments which is capable of controllably producing acoustic pulses free of spurious or uncontrolled transients, such pulses having large amplitudes and occuring at rapid rates of cycling.

It is a further object of the present invention to provide an underwater source adapted to produce seismic signals in sequences having precise timing during a transmission interval.

It is a still further object of the invention to provide an improved marine source adapted to produce seismic signals with controlled amplitudes.

It is a still further object of the present invention to provide an improved marine source which is capable of being controlled to generate impulses upon occurence of command signals, the periodicity of which is in accordance with a code.

It is a still further object of the invention to provide an improved source for use in underwater seismic exploration which is capable of producing a multiplicity of shaped acoustic signals, each in precisely timed relationship with respect to the others.

It is a still further object of the present invention to provide an improved source of seismic signals which can produce a large number of impact events during a transmission interval so as to deliver more acoustic energy over the interval than is practical in a single event even though of larger individual amplitude.

It is a still further object of the present invention to provide an improved acoustic pulse source having higher power conversion efficiency of driving power to acoustic power than sources of a similar type which have heretofore been available.

It is a still further object of the present invention to provide an improved acoustic pulse source which is capable of producing spectral energy distributed uniformly over a frequency range desirable for use in geophysical exploration.

It is a still further object of the present invention to provide an improved source capable of generating acoustic pulses at high cycling rates and with high acoustic pressure which is reliable in operation.

Briefly described, a hydroacoustic pulse source in accordance with the invention contains at least one piston which is movable between an inward position and an outward position. The inward position is the impact position. Impact events occur when the piston reaches the impact position. This piston is part of a mass-spring system which has a resonant period shorter than the shortest interval between pulses in a train of pulses which may be produced by the source. In other words the resonant frequency of the mass-spring system is higher than the highest rate at which the impact events occur during a transmission interval. The spectral shape of the pulses is determined by the mass-spring system. When transmitted in accordance with a code or sequence for distributing energy uniformly over the frequency range for high resolution geophysical exploration, the time duration of the individual pulse may be of the order of 0.003 seconds, providing spectral energy extending beyond 200 Hz, and the repetition frequency of the pulses may be swept over a band as wide as, say, 40 to 80 Hz, although sweeps over somewhat lower bands, e.g., from 5 to 10 Hz or 20 to 40 Hz, may be used. Typically, a transmission interval of four seconds may utilize more than 200 events.

A pair of radiating pistons may be provided. As the pistons move inwardly toward each other under the pressure head of the surrounding water in which they are submerged, they accelerate toward each other into impact relationship at the impact position. The impact may be cushioned by the gas entrained between the pistons. The pistons then turn around (rebound) and move outwardly away from each other to an outward position. The inward and outward movements constitute a cycle during which an impact event and the resulting acoustic pulse is generated. In order to control the duration of the cycles, time the pulses, and preserve the amplitude and shape of the pulses, fluid pressure means, which may be a hydraulic control and actuation system, is provided for controlling the acceleration of the pistons inwardly toward each other to the impact position, so that they reach the impact position at a prescribed time corresponding to desired time of a pulse. When the impact event occurs, which may be detected in response to the pulse, the pistons are accelerated outwardly away from the impact position and then decelerated during the outward portion of their trajectory, such that they reach their outward position at approximately zero velocity. The pistons reach their outward position to be ready for the next cycle in as short a time as possible, but without creating uncontrolled transient acoustic signals due to any abrupt decelerations as the pistons reach their outward position.

In accordance with an embodiment of the invention, the fluid pressure actuated means is controlled in response to the acceleration of the pistons as obtained, for example, from a transducer system responsive to the amplitude of the acoustic pulses, to be operative following impact to apply net hydraulic forces (the forces due to the difference between the hydraulic pressure and the pressure head of surrounding water) in a direction first to accelerate the pistons apart from each other during less than the entire recovery or rearming portion of the cycle and second to decelerate the pistons over the remaining trajectory so that the pistons reach their outward position at about zero velocity. The shape and amplitude of the pulses are thus preserved and spurious impulses are avoided even though the pistons are reset to their outward position rapidly.

In accordance with another embodiment of the invention, the net hydraulic forces are applied during the entire recovery portion of the cycle to accelerate the pistons outwardly, but are less than the forces required to hold the pistons in the outward position against the pressure head of the surrounding water. The net forces are sufficient, however, so that when added to the rebound forces due to the mass-spring system the pistons are brought to their outward position at about zero velocity. Then the hydraulic forces are increased to hold the pistons at the outward position ready to begin the next cycle.

In accordance with a further embodiment of the invention, the net hydraulic forces are applied to urge the piston outwardly at the completion of the piston rebound, when the pistons achieve zero velocity. The flow of the fluid which produces these net hydraulic forces is controlled so that the pistons approach their outward position with their velocity simultaneously approaching zero.

The foregoing and other objects, features and advantages of the present invention as well as presently preferred embodiments thereof will be more fully understood from a reading of the following description in connection with the accompanying drawings in which:

FIG. 4 is a fragmentary sectional view of an impulse source similar to the source shown in FIGS. 1 and 2 which may be provided in accordance with another embodiment of the invention;

Figure 1:
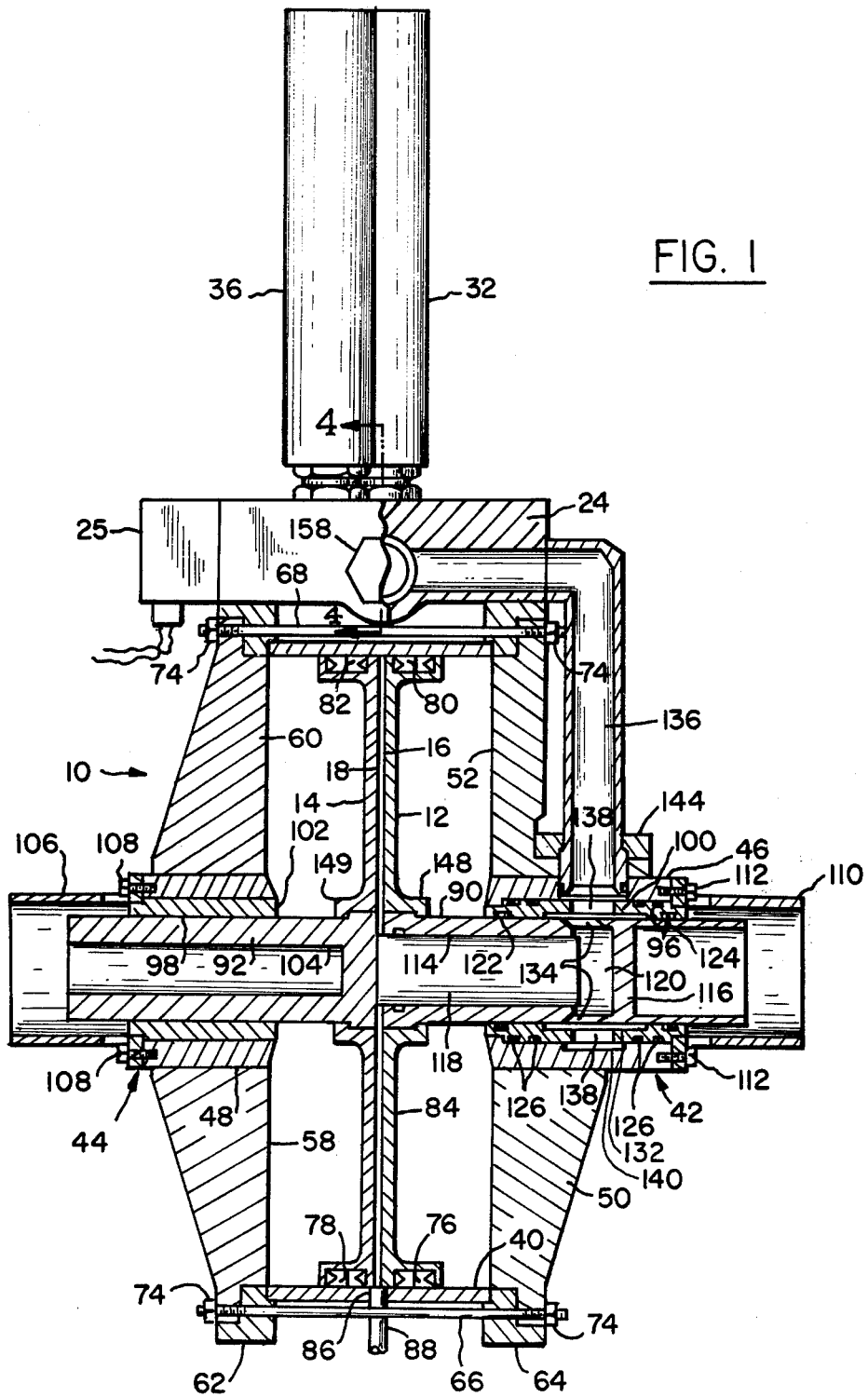
FIG. 1 is the front view of a hydroacoustic pulse source in accordance with an embodiment of the invention, the view being partially in section.
Figure 2:
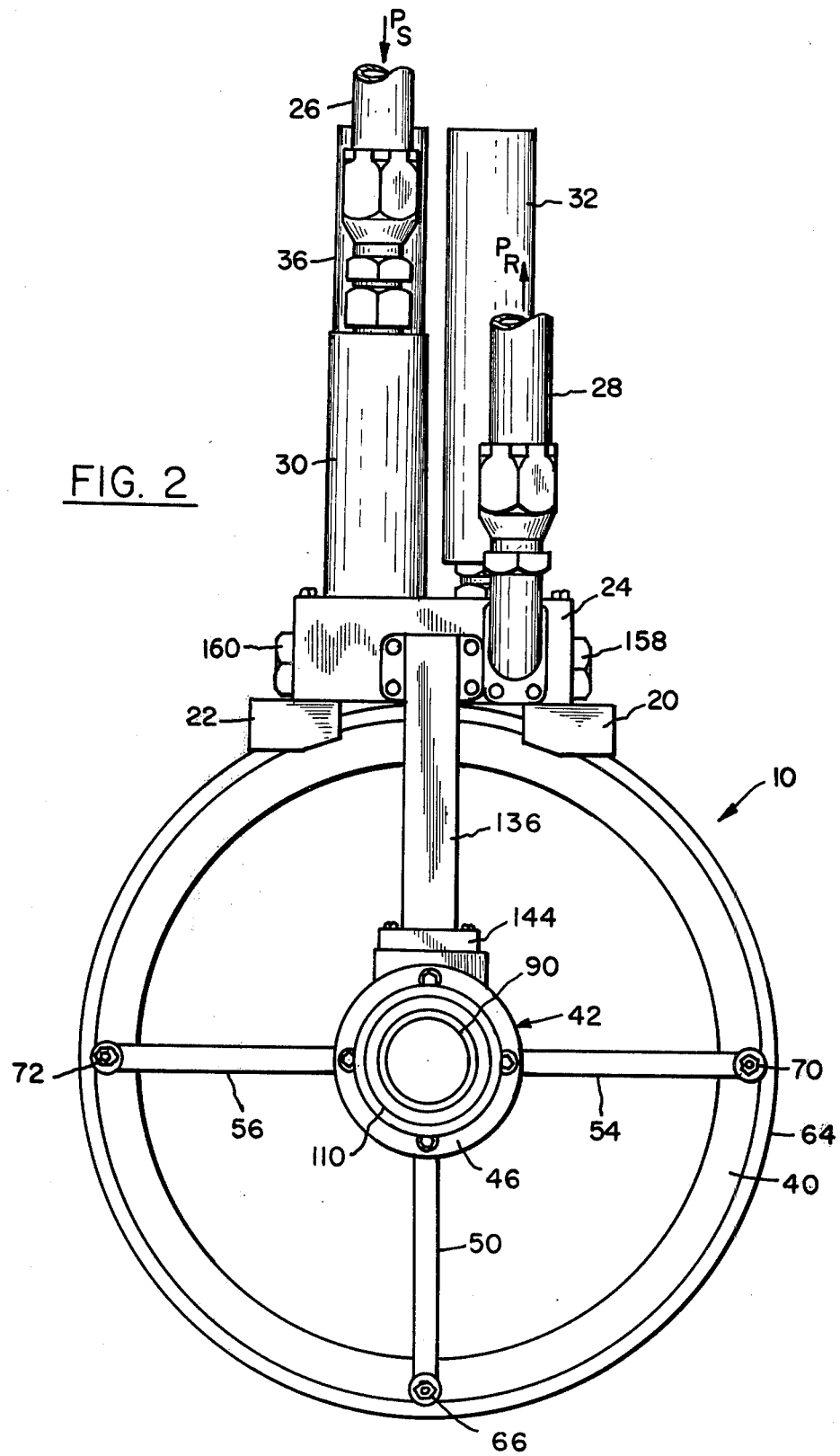
FIG. 2 is an end view of the source shown in FIG. 1, taken from the right as viewed in FIG. 1.
Figure 6:
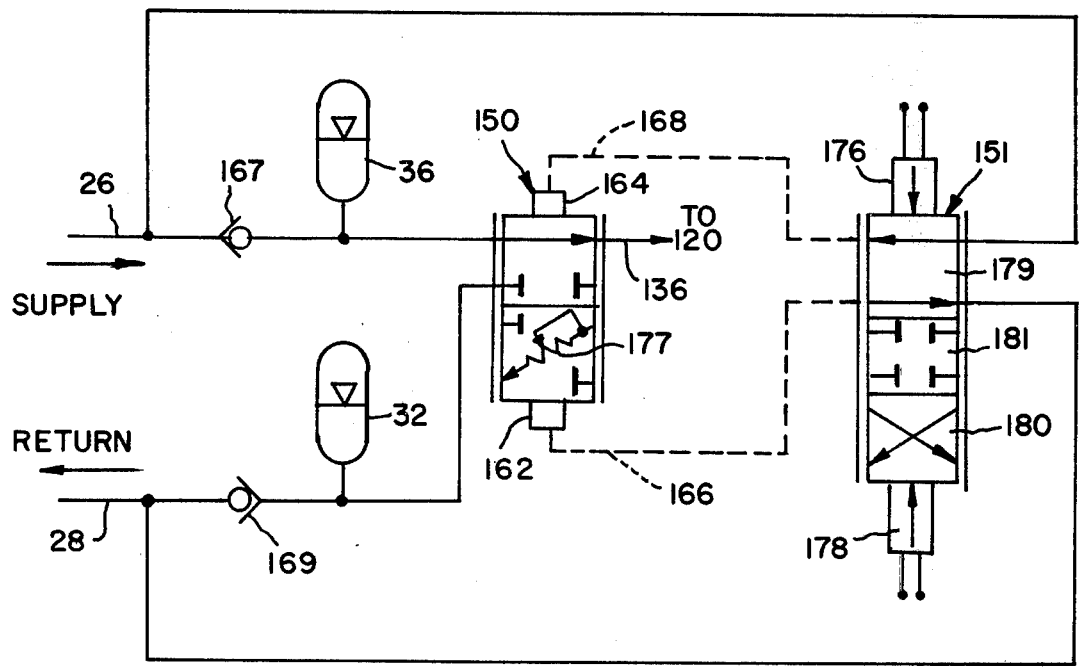
Figure 7A:
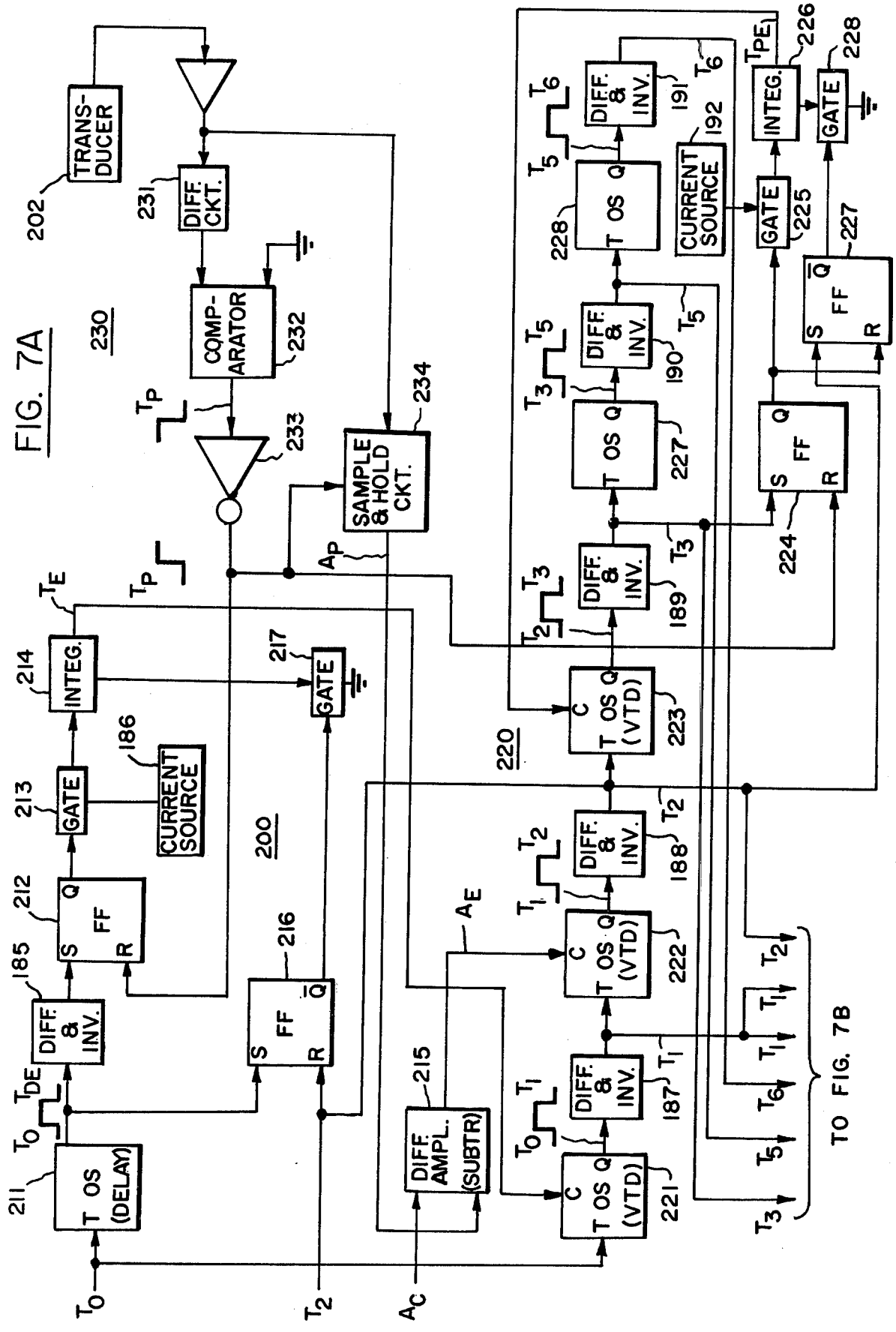
Figure 8:
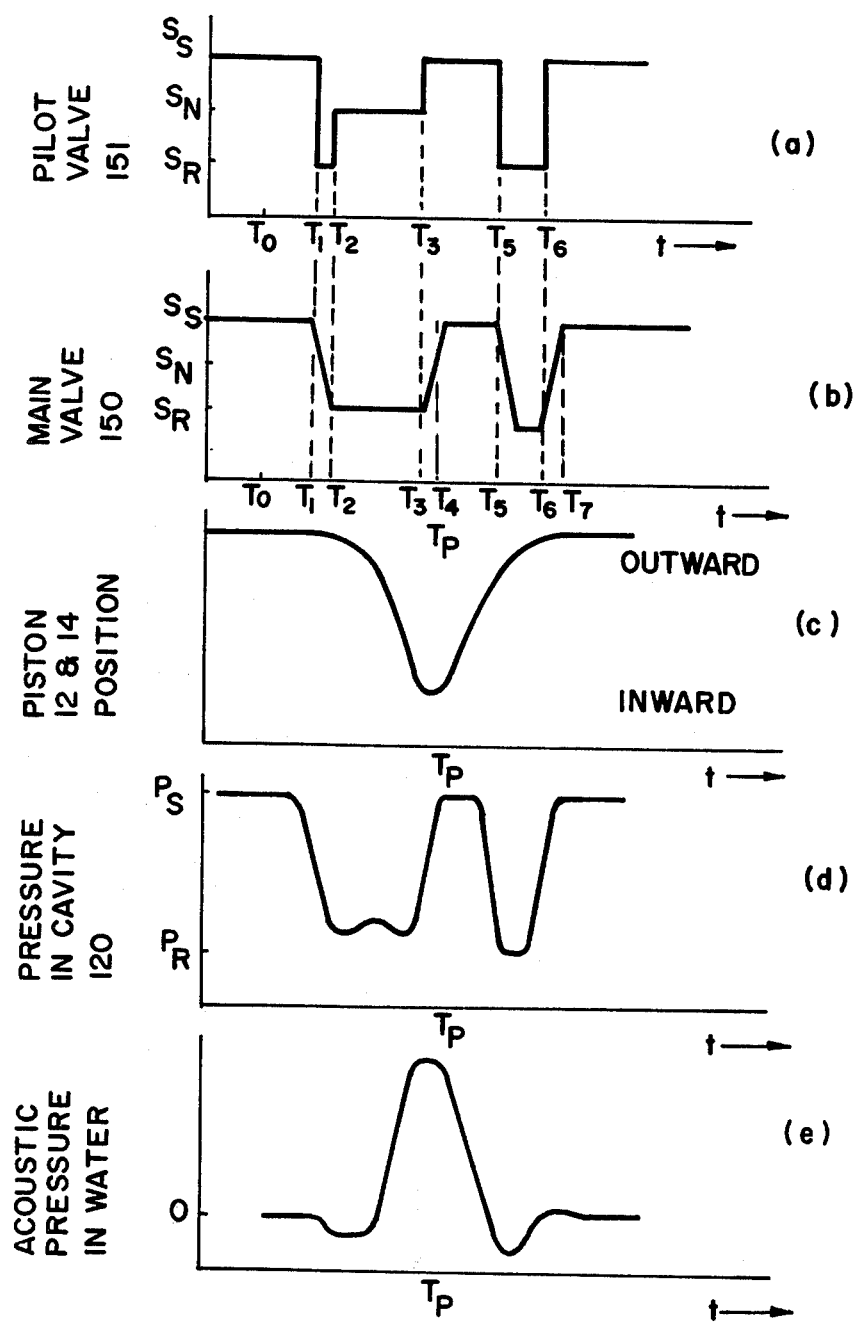
Figure 15:
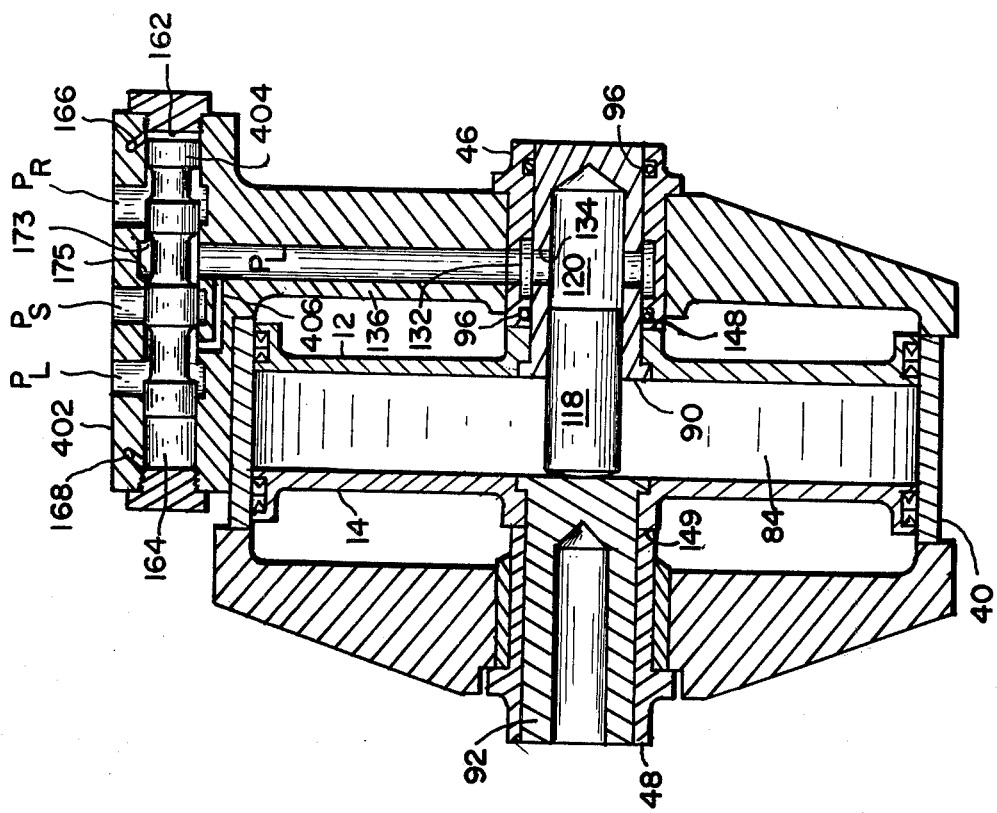

FIG. 5 is a fragmentary sectional view showing the power stage valve and the accumulators associated therewith, which valve is used in the source illustrated in FIGS. 1 and 2;

FIG. 6 is a schematic diagram of the hydraulic circuit used in the source illustrated in FIGS. 1 and 2;

FIGS. 7A and 7B is a block diagram of the control system utilized with the source illustrated in FIGS. 1 and 2;

FIG. 8 are waveform diagrams of pressure, piston displacement, valve position and of the acoustic pressure pulse, during the operation of the control system shown in FIG. 7;

FIGS. 9 and 10 are fragmentary front views of portions of sources similar to the source shown in FIG. 1, but having radiating pistons of concave and convex shape, respectively;

FIGS. 11 and 12 are sectional views diagrammatically showing a hydroacoustic pulse source in accordance with another embodiment of the invention in different positions during operation;

FIG. 13 are waveforms of pressure, piston displacement and valve position during a cycle of operation of the source shown in FIGS. 11 and 12;

FIGS. 14, 15, 16 and 17 are sectional views diagrammatically showing a hydroacoustic pulse source in accordance with still another embodiment of the invention in different positions during a cycle of operation;

FIG. 18 are waveforms, similar to FIG. 8 during a cycle of operation of the source shown in FIGS. 14, 15, 16 and 17; and FIG. 19 are waveforms similar to FIG. 18 showing the cycle of operation of a source in accordance with a further embodiment of the invention.

Referring more particularly to FIGS. 1 and 2, there is shown a marine source which when submerged under water as at sea, may be operated to generate repetitive acoustic pulses. This source has a housing 10 in which are supported a pair of radiating pistons 12 and 14 in symmetrical back-to-back relationship; that is the pistons 12 and 14 have faces 16 and 18 which are opposed to each other. Attached to the housing 10 by brackets 20 and 22, which may be welded thereto, is a housing 24 for fluid pressure control means in the form of a valving mechanism. This mechanism contains a main power stage valve which is disposed in the main body of the housing 24 and a pilot valve which is disposed in an outboard section 25 of the housing 24.

The source is operated by pressurized hydraulic fluid, preferably hydraulic oil, which is delivered to the source from a hydraulic power supply (not shown). The supply provides pressurized hydraulic fluid at supply and return pressures via hydraulic lines 26 and 28, respectively. The hydraulic line 26 is attached to the valve housing 24 by way of an inlet filter 30. The line 26 supplies hydraulic fluid at supply pressure which may for example be from 2000 to 3000 psi. The line 28 is connected to the return side of the hydraulic power supply which may be a reservoir. Hydraulic fluid then flows from the supply into the supply line 26 and out of the return line 28. The energy of the pressurized hydraulic fluid is converted into acoustic pulse energy by the source. The hydraulic circuit of the source, which will be described further in connection with FIG. 5, includes accumulator devices 32 and 36 which are associated with the supply and return sides of the circuit.

The supply line 26, return line 28 and the inlet filter 30 are not shown in FIG. 1 to simplify the illustration. The source may be mounted in a frame (not shown) together with the hydraulic power supply and submerged under water to the operating depth which can be as much as several thousand feet. The entire assembly may be towed by a vessel used to conduct seismic surveys and used either alone or together with a group consisting of two or more of such sources in an array, for geophysical exploration purposes. The symmetry provided in the source of FIGS. 1 and 2 reduces accelerations applied to the housing, valves, supporting frame, and hydraulic lines, therby leading to increased reliability of the source structure.

The housing 10 includes a sleeve 40 which is cylindrical in shape. A pair of web members 42 and 44 are located on opposite sides of the sleeve 40. These web members have cylindrical central hubs 46 and 48, and four struts 50, 52, 54 and 56 which extend radially outward from the hub 46 and four struts, two of which 58 and 60 are shown in FIG. 1, which extend radially outward from the other hub 48. The struts fit into rings 62 and 64 which are sandwiched between the struts and the edges of the sleeve 40 and assembled together by four rods two of which 66 and 68 are shown in FIG. 1 and the other two of which 70 and 72 are shown in FIG. 2. These rods are threaded at their outer ends. Nuts 74 on these threaded ends assemble the housing together.

The radiating pistons 12 and 14 have rims 76 and 78 containing cups in which seals such as chevron seals 80 and 82 are disposed. These seals are in engagement with the sleeve 40 such that a chamber 84 is defined between the opposed faces 16 and 18 of the radiating pistons 12 and 14 and the inner periphery of the sleeve 40. An opening 86 disposed midway between the ends of the sleeve 40 is connected to a line 88. This line is coupled to a vacuum or low pressure pump such that the pressure of a gas, suitably air, in the chamber 84 may be adjusted. This adjustment may be made at the surface such that a partial vacuum exists in the chamber 84. When the source is submerged, a pressure differential is established across each of the radiating pistons 12 and 14 which is equal to the difference between the pressure in the chamber and the pressure due to the sea water head. The forces on the pistons due to the sea water head depend upon the area of the pistons and the differential pressure. The force which is developed on the pistons can drive them inwardly towards the impact position. This impact may be cushioned by the residual compressed gas in the chamber 84. At the impact position, the pistons may not physically touch and may be slightly separated from each other as shown in FIG. 1.

The radiating pistons 12 and 14 are supported in the hubs 46 and 48. The entire structural strength of the webs 42 and 44 support the pistons 12 and 14 along their common central axis on shafts 90 and 92 which extend outwardly from the pistons toward the webs 42 and 44. The hubs 46 and 48 have bores 96 and 98 provided in liners 100 and 102. These liners act as bushings for the shafts 90 and 92. The shaft 92 is provided with a central bore 104 for purposes of lightening its weight. The bore 104 is open at the outward end of the shaft 92 and extends through a tubular extension 106. This extension 106 is secured to the outer end of the hub 49 as by bolts 108. The extension 106 serves as a guard for the shaft 92. A similar extension 110 which is fastened to the hub 46 by bolts 112 similarly serves as a guard for the other shaft 90.

The shaft 90 has a central bore 114 which is closed near the outer end of the shaft by an end section 116. The portion of the bore 114 adjacent to the end section 116 is of somewhat larger diameter than the inner end of the bore. A rod 118 is slidably disposed in the bore 114. The end of the rod 118, the end section 116 and the bore 114 define a chamber 120 for the pressurized hydraulic fluid. In order to prevent the escape of fluid from the chamber 120, seals such as chevron seals 122 and 124 are used so as to permit the shaft 90 to slide inwardly and outwardly in the bore 96 of the liner 100. Seals, such as "O" ring seals 126, around the liner also guard against the escape of pressurized hydraulic fluid. Another seal 130 near the open end of the bore 114 prevents the escape of hydraulic fluid while allowing the rod 118 to move inwardly and outwardly with respect to the shaft 90.

The liner 100 is formed with a peripheral groove 132 which extends axially a distance at least equal to the displacement of the shaft 90. This groove 132 forms a gallery which is connected to the chamber 120 by holes 134. The gallery 132 is in turn connected to a hydraulic feed tube 136 by a number of radial holes 138, two of which are shown in FIG. 1. These holes connect the gallery 132 to a groove 140 in the inner periphery of the hub 46 to provide a tight seal (see also FIG. 14).

As pressurized hydraulic fluid is applied to the chamber 120, the rod 118 is forced inwardly while the shaft 90 is forced outwardly, thereby separating the radiating pistons 12 and 14 from each other. The pistons 12 and 14 have shoulders 148 and 149 which serve as stops which engage the inner ends of the hubs 46 and 48 when the pistons reach the outward position. After the radiating pistons are separated and set at their outward positions, the pressure in the chamber 120 is switched by means of the valving mechanism in the valve housing 24 from supply to return pressure. For acceleration and pulse amplitude control purposes, the main valve may be actuated to a position where it does not fully open the chamber 120 to return. The net pressurized fluid forces on the pistons is then in a direction to drive the pistons inwardly.

As the net force due to the sea water head causes the radiating pistons to rush inwardly toward each other, the rod 118 moves outwardly thus forcing the hydraulic fluid out of the chamber 120. The flow may be throttled if the main valve is not fully open to return and the net force on the pistons reduced. The acceleration of the pistons toward each other into the impact relationship at their impact position can thereby be controlled by opening the main valve proportionately to the return. Since the acceleration is proportional to the acoustic pulse amplitude (see Equation 1), the pulses amplitude is controlled. In addition, control of the acceleration controls the time to impact.

When the impact position is reached the pistons turn around and rebound. The velocity attained by the pistons when they reach impact position is reversed (i.e., $V_o$, the piston velocity at the impact position becomes approximately $-V_o$). The turn around occurs in a time proportional to about one-half cycle of the resonant frequency of the mass-spring system including the mass and stiffness of the pistons and the spring due to the compressed air in the chamber 84 between the opposed faces 16 and 18 of the pistons. The stiffness is primarily due to the compressed air in the chamber and is non-linear, however to a first approximation, the resonant frequency is $$f_o = (1/2\pi)\sqrt{K/M} \qquad (2)$$

where M is the mass associated with the pistons 12 and 14 and their shafts 90 and 92, and K is the effective stiffness of the compressed air spring. The acceleration is a maximum at the impact position, where $V_o$ becomes approximately $-V_o$, and determines the amplitude of the acoustic pulse characteristics of the system.

The maximum acceleration point is detected by the control system, described later in connection with FIG. 7, and indicates when the impact position is reached. Then for a portion, but not all of the time that the pistons recover and move outwards to the outward position, hydraulic fluid is caused to flow into the chamber 120 to separate the pistons. This is accomplished by actuating the main valve to a position where it is fully open to supply. For the remaining portion of the rebound cycle, the main valve is actuated to a position where it is open to return. Net forces on the pistons then decelerate their outward motions bringing them to zero velocity at a position corresponding to the outward limit of piston travel. In this way, the pistons are accelerated or decelerated in their motions over the trajectory by switching the main valve between supply and return pressures. Hydraulic power losses in the valve ports are thereby minimized, leading to a high power conversion efficiency.

The valving mechanism is controlled so as to provide repetitive pulses each time the radiating pistons 12 and 14 move toward each other to the impact position and are turned around by the spring characteristics of the compressed air in the chamber 84 and/or the spring characteristics of the pistons 12 and 14 themselves to rebound outwardly. The arrangement whereby the pistons are slidably supported and secured in the hubs 46 and 48 of the housing 10 within the webs 42 and 44, while guided at their outer peripheries by the sleeve 40, provides a structure capable of withstanding the forces due to the sea water head and forces which are generated on impact so as to provide a high degree of structural integrity and reliability in operation. The hydraulic fluid pressure means, including the valving mechanism and its control which provides for the generation of acoustic pulses respectively at high rates, will be described in greater detail hereinafter in connection with FIGS. 5 to 8.

Figure 3:
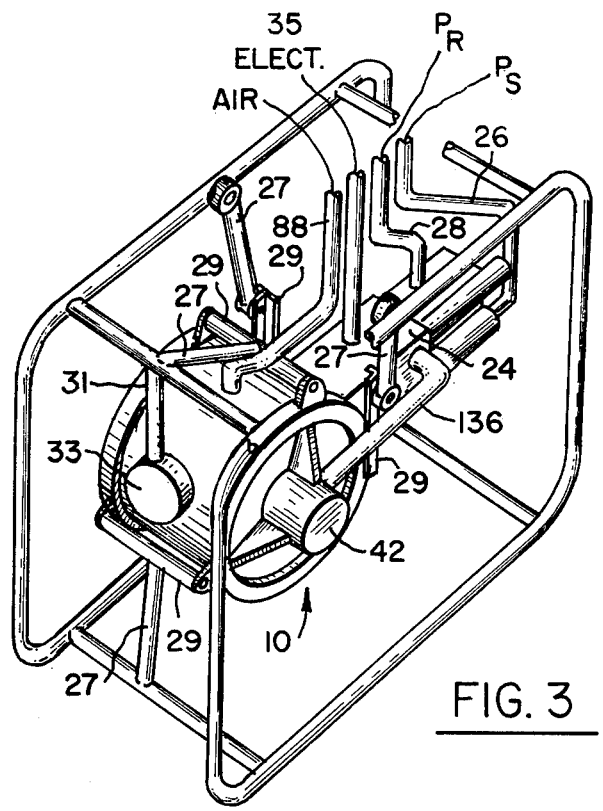
FIG. 3 is a perspective view of the source shows in FIGS. 1 and 2 together with associated apparatus which provides a hydraulic source system.

FIG. 3 illustrates the hydroacoustic source system assembled for towing as from a seismic surveying vessel. A frame work 25 made of tubular members defines an open box in which the housing 10 is mounted. Ears 27, which may be assembled to the webs 42 and 44 by brackets, 29 attach the housing 12 to the framework 25. A spider 31 attached to one side of the framework supports a hydrophone 33. The hydrophone and the pistons 12 and 14 are mounted along the same axis such that the hydrophone is directly in the path of the acoustic pressure pulses which are generated by the source. The hydrophone 33 outputs an electrical signal, corresponding to the pulse, which is used in the control of the source as will be explained more fully as this description proceeds.

A conduit 35 for electrical control signals, lines 26 and 28 for the pressurized hydraulic fluid and the air line 88 are connected to the source as explained above. The lines may be rigid tubes which are brought out of the framework 25 to flexible hoses (not shown). The conduit 35 is brought out to a flexible cable (not shown).

The ends of this cable and the hoses may be mounted on a carriage which is secured to the framework or by wire rope to limit play of the hoses to that which the conduit and lines can take. The framework is secured to the vessel by towing cables and sufficient slack is provided in the hoses and electrical cables to avoid any load bearing stresses therein.

Another embodiment of the impulse source which provides simplification by eliminating the freely movable rod 118 is shown in FIG. 4. The parts of the source, shown in FIG. 4 which are similar to the source shown in FIGS. 1 and 2 have like reference numerals. The rod 118a in the embodiment shown in FIG. 4 is integral with the shaft 92a which is attached to the radiating pistons 14 and extends inwardly into the bore 96 in the shaft 90 which supports the radiating piston 12. The rod 118a, like the rod 118, serves as a piston to separate the radiating pistons 12 and 14 when hydraulic fluid at supply pressure is caused to flow into the chamber 120 behind the rod 118a. The rod 118a has a bore which lightens the weight of the shaft 92a and radiating piston 14 assembly. The radiating pistons 12 and 14 are shown in FIG. 4 in their outward position with the shoulders 148 and 149, where the radiating pistons join the shafts 90 and 92, stopped against the inner ends of the hubs 46 and 48.

While actuation of both pistons using a single valving mechanism in communication with a single chamber and double acting shaft and rod is presently preferred, separate valving mechanisms operated simultaneously with separate chambers and a single acting rod may be used in carrying out the invention.

Referring to FIGS. 5 and 6, the power stage valve 150, as shown in FIG. 5, has a spool 152 which is movable axially in a bore 154. This spool bore 154 is provided in a block 156 which is contained in the valve housing 24. The ends of the bore 154 are closed by threaded plugs 158 and 160 (see also FIGS. 1 and 2). In the bore 154 at the opposite ends of the spool 152, are control chambers 162 and 164. Passages 166 and 168 connect these control chambers 162 and 164 to the pilot valve 151, which switches the pressure in these control chambers to supply or to return or closes the chambers. With supply pressure in the chamber 162 and return in the chamber 164, the spool valve is shifted to the left, (down in FIG. 6) which opens the port 173. The extent to which the port 173 is opened, whether fully to return, as shown in FIG. 5, or less, depends upon the time that the pressure in the chamber 162 is switched to supply and the chamber 164 to return: i.e., how long the connections schematically shown at 181 in the pilot valve 151 are made determines the valve opening extent. Accordingly, the path to return in the main valve 150 is shown as a variable resistor 177.

The feed tube 136 is connected to the central chamber 170 in the spool valve bore 154. The supply and return lines are respectively connected to the chambers 172 and 174 on opposite sides of the central chamber 170. The supply and return accumulators 36 and 32 are connected to the supply chamber 172 and the return chamber 174 of the valve. The accumulators 32 and 36 may be gas filled movable piston accumulators. The lines 26 and 28 to the accumulators may have one way check valves 167 and 169 therein.

The pilot valve 151 is an electrohydraulic device which is actuated in opposite directions by an electromagnetic driver. This driver is shown as a pair of solenoids 176 and 178. Other electromagnetic drivers such as the torque motors used in servo valves may be employed. Control signals generated by the control system shown in FIG. 7 are applied to the solenoids. The pilot valve has three states or positions shown schematically by the connections 179, 180, and 181 which are made in each of these states. In the position 181, to which the valve 151 is automatically biased when the solenoids 176 and 178 are de-energized as by springs, the control chambers 162 and 164 are closed off and the main valve 150 may be selectively positioned and retained in the selected position.

The control system is shown in FIG. 7 and its mode of operation is illustrated in FIG. 8. FIG. 8(e) portrays the source transmitted acoustic pulse pressure signature or wave form. The positions of the pilot valve 151 and the main valve 150 which produce the acoustic pulse waveform are shown in FIGS. 8(a) and 8(b), respectively.

As explained above, the pilot valve 151 is commanded to take only one of three positions: $S_S$, full open to supply which is shown at 179 in FIG. 6; $S_R$, full open to return which is shown at 180 in FIG. 6; or $S_N$, center (no flow) condition which is shown at 181 in FIG. 6. The electrical control signals to this valve 151 operate the valve so that it assumes these three positions by applying either full control current to one solenoid 176, or to the other solenoid 178, or no control current to either solenoid.

The main valve 150 is usually commanded either to full supply, $S_S$, or full return, $S_R$, positions, except during the time when the pistons 12 and 14 are moving inwardly to impact position, which may be called the fall time, when the main valve 150 is driven to a position slightly less than full return. This interval is shown as being from $T_2$ to $T_3$.

At the beginning of the cycle a transmit command is provided at $T_0$. After a brief delay to account for source variations, the pilot valve 151 receives a command to return which is generated by the control system at $T_1$. The duration, $T_1$ to $T_2$, controls how much fluid is transferred to control chambers 162 and 164 of the main valve 150, and hence its spool 152 position. At $T_2$, the pilot valve 151 assumes center position 181 where it is closed, and the main valve remains in the partially open to return position until $T_3$. During the interval $T_2$ to $T_3$ the pistons are accelerating inwardly toward their impact position. The pressure in the cavity 120 (see FIG. 8(d)) drops but does not reach return pressure $P_R$ since the port 175 is not fully open. The pressure in the cavity 120 undergoes some fluctuation due to the return accumulator 32 (FIG. 6). At $T_3$ the pilot valve 151 is switched to supply $S_S$ (position 179), and the main valve 150 follows at its maximum slew rate. The timing determines that the spool 152 of the main valve passes through its center position with both ports 173 and 175 (FIG. 4) closed at the instant of maximum transmitted pressure, which also corresponds to a zero fluid flow condition. The main valve continues on to supply $S_S$, and after a time interval $T_3$–$T_5$ during which the supply pressure delivers energy (force and flow) to rearm the pistons 12 and 14, the pilot valve 151 is, at $T_5$, again switched to return $S_R$ (position 180) and the main valve 150 follows. During the next interval $T_5$–$T_6$, the pressure in chamber 120 is switched to return $P_R$ and fluid flow is decreased in the return line from the chamber 120 as the pistons decelerate toward their outward position (see FIG. 8(c)). After this interval, at $T_6$, the pilot valve 151 is again switched to supply $S_S$ (position 179)

and the main valve opens to supply position $S_S$ to switch the pressure in chamber 120 to supply pressure $P_S$ and hold the pistons in their outward position in preparation for the next transmit command. The cycle is fully completed when the main valve 150 reaches supply position $S_S$ at $T_7$ and the chamber 120 is at supply pressure $P_S$.

The control system (see FIG. 7) has an input section 200 which accepts the transmit timing command $T_0$ and the amplitude control command level $A_c$. A control signal generating section 220 develops the intermediate command timing signals. A detector section 230 includes an underwater transducer 202, such as the hydrophone 33 (FIG. 3), which may be located near the source to provide the pressure pulse signature, which is shown in FIG. 8(e). The detector section 230 develops control signals representing the actual time of transmission of the acoustic pulse $T_p$ and its amplitude $A_p$. Section 240 generates the signals which operate the solenoids 176 and 178 of the pilot valve 151. The transducer 202 has advantages of reliability and simplicity. Other sensors may be used for detecting the pistons reaching their inward position (i.e., the impact position). Such sensors may respond to the displacement, velocity or acceleration.

When the transmit command $T_0$ arrives, it is applied to a One Shot 211. The delay time of this One Shot 211 represents the expected delay, $T_{de}$, between the transmit command and the transmitted signal for all sources which may be in the array or an individual source if only one is used, less a small time variation representative of the variations expected during operation of the sources. At the conclusion of this time interval $T_{de}$, a flip-flop 212 is set by the negative going edge of the One Shot output pulse which is detected by a differentiating and inverting circuit 185. The flip-flop 212 is subsequently reset at $T_p$. $T_p$ is the peak of the acoustic pulse which occurs when the acceleration of the pistons is maximum. This occurs at the impact position, and is taken as the time of the impact event, and the actual instant of transmission. During the interval between the end of $T_{de}$ and $T_p$, a current switch provided by an analog gate 213 passes current from a current source 186 into an integrator 214 which develops an analog timing error signal $T_E$ representing the time interval between the desired impact event time and the actual impact event time. The integrator 214 is subsequently discharged at $T_2$ using a flip-flop 216 and a switch provided by another analog gate 217 just prior to acquiring a measurement of the error signal $T_E$.

The analog amplitude control command $A_c$ is applied to a difference amplifier 215 with the measured amplitude $A_p$ level, The difference output $(A_c-A_p)$ from the amplifier 215 is an amplitude error signal, $A_E$.

The measured outputs $T_p$ and $A_p$ are derived in the detector section 230. The transducer 202 signal is differentiated in a differentiating circuit 231. A zero derivitive, which occurs at the peak transmitted pressure, is measured by comparing the differentiated signal with a zero reference level (ground) in a comparator 232 at $T_p$. Simultaneously, a sample-and-hold circuit 234, samples the pressure signal at this same instant, developing an analog representation $A_p$ of the peak pressure transmitted by the source.

The control signal generating section 220 contains a train of variable time delay (VTD) circuits such as controlled One Shots 221, 222 and 223 and other One Shots 227 and 228. These One Shots are each triggered by the falling and trailing edges of the pulses from their preceding One Shots by differentiating and inverting circuits 187 to 190. Another differentiating and inverting circuit 191 in the train provides the last timing signal at $T_6$. The sequence begins with the transmit command $T_0$ which triggers VTD 221. The delay time of VTD 221 $(T_1-T_0)$ is adjusted by the timing error signal $T_E$, such that later in the cycle the source transmits precisely at the desired time. At the conclusion of this interval $(T_1-T_0)$, the pilot valve command to $S_R$ (position 180—FIG. 5) is issued at $T_1$, and the source begins its transmission cycle.

The $T_1-T_2$ interval is generated by VTD 222, which is adjusted by the amplitude error signal $A_E$ so that the source provides the peak pressure level determined by $A_c$. Changing this interval, $T_1$ to $T_2$, varies the main valve 150 return port 173 opening which controls the pressure in and the flow from chamber 120 (See FIG. 8(d)) and the net pressurized fluid forces across the pistons 12 and 14 during the fall time. Lengthening the interval $T_1$ to $T_2$ causes a more intense transmit pressure pulse.

At $T_2$ the pilot valve 151 is returned to $S_N$ center position, which holds the spool 152 of the main valve 150 at the position set by the pilot valve switching time, $T_1$ to $T_2$, through the fall time (See FIGS. 8(a) and 8(b)). After an interval, $T_2$ to $T_3$, which is slightly less than the actual fall time, a control signal at $T_3$ is developed. This signal commands the pilot valve 151 to supply $S_S$ (position 179). The main valve 150 follows at its slew rate. The delay time of the VTD 223 is controlled so that the timing signal is generated at $T_3$ at such time prior to $T_p$ that the main valve passes through its center position, $S_N$, at exactly $T_p$ (see FIGS. 8(b) and 8(c)). A flip-flop 224 is set when the pilot valve 151 is commanded to supply, $S_S$ (position 179) and reset at the detected transmit time $T_p$, when the level from the inverter 233 goes positive. An analog gate 225 provides a current switch and charges an integrator 226 from a current source 192, which develops an analog error signal $T_{pe}$ proportional to the time interval between the pilot valve command at $T_3$ and the transmit pulse at $T_p$. This error signal is used at adjust the delay time of the VTD 223 so that the valve command $T_3$ precedes the pressure pulse by the proper time interval. The integrator 226 is reset at time $T_2$ by a flip-flop 227 and an analog gate 228 acting as a switch to be prepared for an error measurement.

After the impact event at $T_p$, the pistons rebound and move outwardly to the outward position against the stops defined by the inner ends of the hubs 46 and 48 and the shoulders 148 and 149 (FIG. 1). The duration of this outward movement portion of the cycle is controlled and minimized by introducing hydraulic pressure at supply to provide net hydraulic forces to accelerate the pistons outwardly from the inward impact position and then to decelerate the pistons in the outward portion of their trajectory so that the pistons reach the outward position with approximately zero velocity. In this embodiment, the net hydraulic forces are in the outward direction at the beginning of the outward portion of the trajectory for a period of time shorter than the period or duration of the outward movement. This period of time is adjusted such that the pistons reach the outward position against the stops when at substantially zero velocity. Transients in the acoustic pulse such as spurious signals due to vibrations of the pistons and ringing of the support structure are thereby avoided. The period of time when the net hydraulic forces in the outward direction are developed is obtained with the One Shots 227 and 228. These One Shots are pre-adjusted to provide the desired energy transfer and recovery in intervals $T_3$-$T_5$ and $T_5$-$T_6$, respectively.

The signals at $T_5$ and $T_6$ are used to command the pilot valve to return $S_R$ and then to supply $S_S$. The main valve 150 follows as shown in FIG. 8(b). At the end of the cycle, after $T_7$, both valves 150 and 151 are at supply states $S_S$, and supply pressure in the chamber 120 holds the pistons in outward position against the stops (See FIG. 8(d)).

In the valve command system, 240, the solenoids 176 and 178 of the pilot valve 151 are shown. When the solenoid 178 is energized it causes a movement to supply $S_S$. The other solenoid 176 causes a movement to return $S_R$, when it is energized. Absense of signals to either of the solenoids will leave the pilot valve in the center state $S_N$, or closed position (181—FIG. 6). Levels are generated by logic, consisting of flip-flops 241 to 244 and OR gates 245 and 246, in response to the timing signals at $T_1$, $T_2$, $T_3$, $T_5$ and $T_6$. These levels are applied to amplifiers 247 and 248 to the solenoids 176 and 178.

As shown in FIG. 8(a), the pilot valve is open to supply $S_S$ in the intervals $T_3$-$T_5$ and $T_6$-$T_1$. Flip-flops 241 and 242 are set during intervals $T_3$-$T_5$ and $T_6$-$T_1$, respectively. The Q outputs of these flip-flops 241 and 242 are combined in OR gates 245 and 246 and cause the pilot vaLve to be appropriately commanded through the amplifier 247 within these intervals. In a like manner, the flip-flops 243 and 244 are set during the intervals $T_1$-$T_2$ and $T_5$-$T_6$, respectively, and provide valve command signals to return, $S_R$, during these intervals.

FIGS. 9 and 10 show two different types of radiating pistons, both of flexural construction (i.e., the pistons are flexural discs). In FIG. 9 the pistons 12a and 14a are concave and upon engagement are supported along their peripheries while undergoing flexing. In FIG. 10 the pistons 12b and 14b are convex, and upon engagement are supported near their centers while undergoing flexing. The stiffness of the mass-spring system and the source is not dependent on the compressed air in the chamber 84 for its spring parameter. The stiffness of the system is controlled and linearized by the linear stiffness of the flexural pistons such that the shape of the acoustic pulse is controlled by the stiffness characteristics of the pistons themselves.

Referring next to FIGS. 11, 12 and 13 there is shown a hydroacoustic pulse source 300 in accordance with another embodiment of the invention. The source 300 is similar in several respects to the source 10, which is described above in connection with FIGS. 1, 2 and 4. The like parts of both sources 10 and 300 are given like reference numerals. The illustration of the source 300 in FIGS. 11 and 12 is simplified for purposes of this explanation.

The source is characterized by additional hydraulic means which apply hydraulic fluid at three different pressures, namely, a high latching or holding pressure indicated as $P_L$, an intermediate pressure indicated $P_S$ and a low pressure indicated as $P_R$. These pressures may be provided by the same or different hydraulic power supplies. $P_R$ is the return pressure while $P_S$ and $P_L$ are the elevated pressures. The intermediate pressure $P_S$ and the return pressure $P_R$ are applied to the radiating pistons 12 and 14 through the use of a hydraulic circuit including the main valve 150, the hydraulic feed tube 136, the gallery 132, and the porting hole 134.

The chamber 120 receives pressurized fluids at the $P_S$ or $P_R$ pressures which are switched by the valve 150. The latching pressure $P_L$ is introduced into the chamber 120 by way of a low power hydraulic circuit having a passage 302 which is restricted by a narrow orifice 304. The orifice is connected to the peripheral groove in the axial bore 96 of the hub 46 which provides a gallery 306. The gallery 306 is spaced outwardly from the gallery 132 through which the hydraulic fluid at the $P_S$ and $P_R$ pressures can flow into the chamber 120. It is only when the radiating pistons 12 and 14 are at their outward positions, as shown in FIG. 12, that the hydraulic fluid at the latching pressure $P_L$ can flow into the chamber 120 via the porting hole 134. When the radiating pistons are in their outward position, the main valve 150 is in the null or center position, with the ports 173 and 175 to the return and supply lines closed. The only flow requirement of the high pressure latch circuit is to overcome the leakage through the main valve 150 at its null position, which is shown in FIG. 12. The flow is further restricted by the restricting orifice 304. Accordingly, only low hydraulic power is required from the latch circuit. The hydraulic fluid at the latching pressure $P_L$ may be continuously applied to the passage 302.

The operation of the source 300 will be more apparent from FIG. 13. Consider that the radiating pistons 12 and 14 are initially in their outward position as shown in FIG. 12. The latching pressure $P_L$ is then present in the chamber 120 and the hydraulic forces due to the latching pressure, which are applied to the rod 118, are sufficient to hold the pistons 12 and 14 in their outward position against the pressure head of the sea water. At about $T_a$, the command to generate an acoustic pulse causes the pilot valve 151 (see FIG. 6) to apply operating pressures in the control chambers 162 and 164 of the main valve 150 which shift the valve to the left, away from the null position shown in FIG. 12. The valve position during the cycle of operation is illustrated in FIG. 13(c). The return port 173 may be controlled as described in connection with FIGS. 6 and 7 in order to control the amplitude of the resulting acoustic pulse by varying the pressure $P_R$ in the chamber 120. The variation in return pressure is indicated in FIG. 13(a) by the dashed line 308.

During the interval $T_a$ to $T_p$ the radiating pistons 12 and 14 rush inwardly toward each other to the impact position shown in FIG. 11. The acoustic pulse is produced with its maximum amplitude at $T_p$. The pistons also achieve zero velocity at $T_p$. The time $T_p$ is detected, as explained in connection with FIG. 7 and the spool of the main valve is shifted to the right. The supply port 175 opens and the return port 173 closes; thus switching the pressure in the chamber 120 from $P_R$ to $P_S$ when the pistons are in the vicinity of their inward position thereby to assist piston rebound. The pressure $P_S$ is maintained until time $T_c$ when the radiating pistons 12 and 14 reach their outward position. At time $T_c$ the spool 152 of the main valve returns to the null position and the latching pressure $P_L$ takes over and holds the pistons 12 and 14 in their outward position. The pressure $P_S$ is sufficient to supply that energy during rebound of the pistons to their outward position such that the pistons reach their outward position at approximately zero velocity at time $T_c$. The pressure $P_S$ is lower than the latching pressure $P_L$ and alone would be insufficient to hold the radiating pistons 12 and 14 in their outward position. In the absence of a latching pressure $P_L$ at time $T_c$, the pistons would fall back inward along the dashed line trajectory 500 in FIG. 13(b).

The pressure $P_S$ is, however, sufficient to bring the radiating pistons to their outward position with approximately zero velocity. Accordingly, when the shoulders 148 and 149 reach the inner end of the hubs 46 and 48, which limit the outward movement of the radiating pistons 12 and 14, their engagement is with approximately zero velocity, such that transients are not produced in the generation of the acoustic pressure pulse as would be the case if a pressure sufficient to hold the pistons in outward position were applied during the entire return or recovery portion of the cycle (viz. from $T_p$ to $T_c$). Bouncing of the radiating pistons upon their reaching the outward position and the consequential undesirable transients in the acoustic pulse wave form are thereby eliminated. The high latching pressure may, for example, be about twice the intermediate pressure $P_S$. In the case of a source having radiating pistons approximately three feet in diameter the $P_L$ pressure may be 2600 psi and the intermediate pressure $P_S$ may be 1200 psi. These pressures may be varied in accordance with the design of the source to accommodate the dimensions used for the radiating pistons, the shaft 90 and the rod 118.

In the source 300 of FIGS. 11 through 13, switching of the pressures in the chamber 120 always takes place when the pistons 12 and 14 have zero velocity. Consequently, cavitation in the valving regions is avoided. When starting the source, a cocking pressure may be applied by way of a start-up valve, not shown, which is connected to the feed tube 136. Alternatively, high pressure gas may be forced into the chamber 84 between the pistons 12 and 14 to separate the pistons. This gas is then exhausted so that a low pressure or partial vacuum exists within the chamber 84 before transmission of a sequence of acoustic pulses.

A hydroacoustic pulse source 400 which is illustrated in FIGS. 14 to 17 has the advantage of eliminating the need for a separate hydraulic circuit for applying the hydraulic fluid at the latching pressure $P_L$ to the chamber 120. The source 400 utilizes a three-pressure selector main valve 402. Otherwise the source 400 is similar to the source 10, described in connection with FIGS. 1, 2 and 4 like parts are indicated by like reference numerals.

The valve 402 has a spool 404 having four lands and three grooves. The lands and groove on the left side of the spool 402 switch the latching pressure $P_L$ to the feed tube 136 by way of a passage 406. The third land from the left defines the ports 173 and 175 which switch the pressure between $P_S$ and $P_R$. The valve 402 is actuated and shifted left or right by the control pressures which are switched via the pilot valve 151 (FIG. 5) to control chambers 162 and 164.

Figure 14:
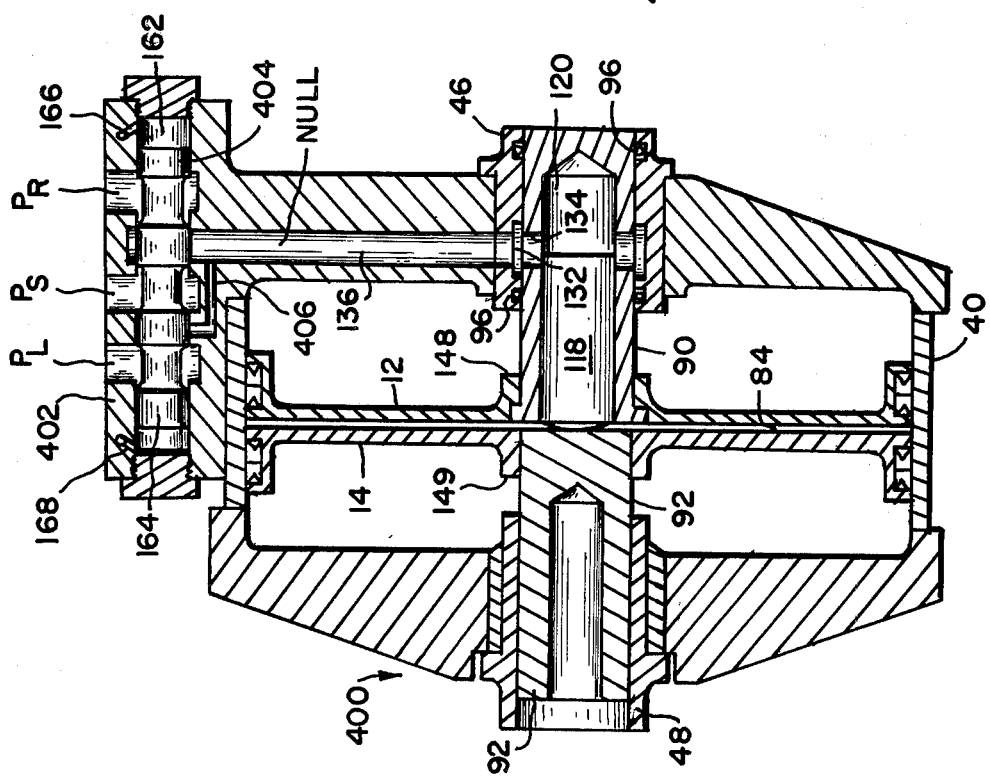
Figure 16:
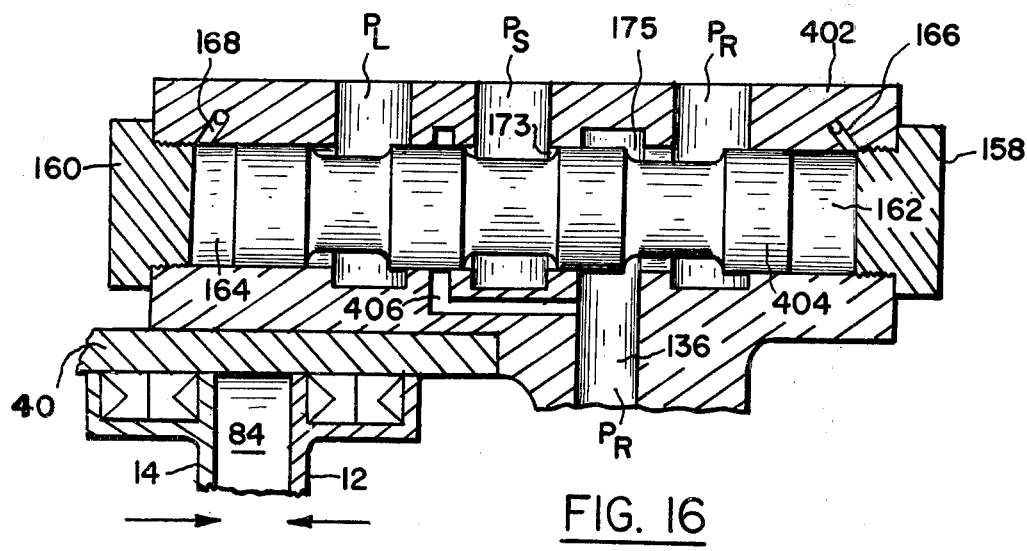

The operation of the source 400 will be understood from FIG. 18. At the start-up (i.e., before the operating pressures are applied to the source) the radiating pistons 12 and 14 are in their inward position as shown in FIG. 14. Then, the pilot valve 151 is operated to shift the spool 404 of the valve 402 to the right (see FIGS. 15 and 18(a)), and the latching pressure $P_L$ is admitted to the chamber 120. The pistons 14 and 12 then move outwardly against the sea water pressure head to the position shown in FIG. 15. The source is now in position to begin the transmission of a sequence of pulses.

Figure 17:
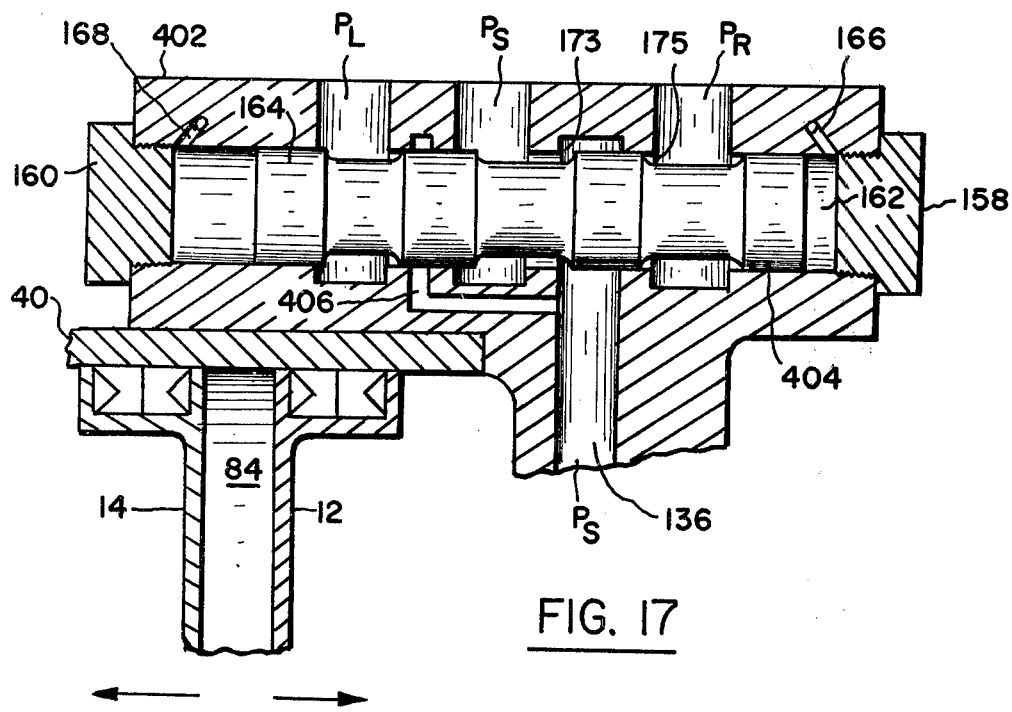

At time $T_a$, the command to transmit the first pulse results in the spool 404 being shifted to the left. The passage 406 is closed and the return pressure line is connected to the feed tube 136 by way of the return port 175 (see FIG. 16). The pistons 12 and 14 then rush inwardly toward each other and arrive at the impact position at $T_p$. The acoustic pulse has its maximum amplitude at $T_p$. This amplitude is detected and used to control the valving mechanism. The spool 404 is shifted to the right, during the interval when the piston velocity is near zero, opening the port 173 and closing the port 175. The passage 406 remains closed and the pressure is switched from $P_R$ to $P_S$. Accordingly, while the pistons 12 and 14 are rebounding, as shown in FIG. 17, the intermediate pressure in the chamber 120 assists to drive the pistons to their outward position (see FIG. 18(b)). The pistons arrive at their outward position at time $T_c$ with zero velocity (see FIG. 18(c)). Bouncing against the stops where the shoulders 148 and 149 meet the head 46 and 48 is therefore avoided and transients in the acoustic pulse train are eliminated. At time $T_c$ the spool 404 is shifted further to the right (see FIG. 15). The passage 406 is then opened to that hydraulic fluid at $P_L$ is admitted to the feed tube 136 so as to hold the pistons 12 and 14 at their outward position. The supply and return lines to $P_S$ and $P_R$ are closed (the ports 173 and 175 being in closed condition). The cycle repeats when a command to transmit the next acoustic pulse is received. In the cycles represented by FIGS. 13 and 18, in contrast to the cycle of FIG. 8, the switching of the main valve between supply and return pressures occurs when the velocity of pistons 12 and 14 is low. Low velocity of the pistons corresponds to low flow velocity through the supply and return ports 173 and 175, and hence, low power loss in the orifice corresponding to these ports. In the cycle of FIG. 8, the switching between supply and return at time $T_5$ can occur when the piston velocity is still appreciable. The devices of FIGS. 11 and 14 may be advantageous where higher efficiency of operation than the device of FIG. 1 is desired (at the expense of somewhat greater mechanical and hydraulic complexity).

FIG. 19 shows the cycle where the switching of the pressures in cavity 120 do not occur at the impact point $T_p$, but at other zero velocity times in the cycle where the rate of change of velocity in the vicinity of the switching point is not as high as it is at $T_p$. The structure may be as in FIGS. 1-4. The commands to the pilot valve may be generated after the transmit command by a system of the design described above in connection with FIG. 7. At $T_a$, the command to return causes the main valve to shift abruptly towards position $S_R$. The return port 175 may not be fully (100%) opened in order to control the flow through the main valve 150 and thereby control the amplitude of the acoustic pulse.

The pistons 12 and 14 accelerate inwardly from the outward position and rebound off the spring system (e.g., the pistons mass and the compressed air in the chamber 84 between the pistons). At $T_p$ the acoustic pulse reaches its maximum amplitude and the pistons are at the inward impact position and achieve zero velocity (see FIG. 19(b)), but have high acceleration. The pistons rebound off the spring system. Since the pressure in the cavity 120 is then at return, the net hydraulic forces are in the inward direction. As the outward force on the pistons due to the compressed gas in chamber 84 becomes less than the net inward hydraulic forces on the pistons, the pistons decelerate. At the completion of the rebound the pistons again achieve zero velocity. This occurs intermediate of the outward portion of the trajectory as shown in FIG. 19(b). Then and at time $T_c$ a command to the pilot valve 151 very quickly shifts it to position $S_S$ and then back to $S_N$. This results in the main valve 150 supply port 173 being just slightly opened (as shown in FIG. 19(a)).

The pressure in the chamber 12 rises slowly as shown in FIG. 19(c) to provide a net outward force on the pistons 12 and 14 of about zero; the force of the ambient sea water head and the force of the air in chamber 84 just balancing the hydraulic force on the rod 118 (see FIG. 1). The flow into the chamber 120 is then resistance controlled by the high resistance in the supply port. The pistons 12 and 14 move apart without accelerating until they reach the outward position at time $T_d$ against the stops 148 and 149. The pressure in the chamber 120 is then at $P_S$ (see FIG. 19(c)). The shape of the acoustic pulse is shown in FIG. 19(d). There are no significant acoustic transients, since the piston velocity is approximately zero as the pistons approach the outward position.

From the foregoing description it will be apparent that improved sources of seismic signals is provided. This source is capable of providing sequences of pulses where the pulses are generated in rapid succession. While various embodiments have been described, variations and modifications within the scope of the invention will undoubtedly suggest themselves to those skilled in the art. Accordingly, the foregoing description should be taken as illustrative and not in a limiting sense.

What is claimed is:

1. A hydroacoustic source operative when submerged in a marine environment for generating upon successive commands acoustic pulses of controlled amplitude and spectral shape in a precisely timed train of pulses, said source comprising (a) at least one piston having an outer surface exposed to said marine environment and moveable in opposite directions between an inward and an outward position, for generating successive pulses of said train when said piston reaches said inward position, (b) a housing having a sleeve disposed around the circumference of said piston and in a sliding relationship therewith to define a region, bounded partially by the inner surfaces of said piston and said sleeve, which region is initially at a pressure which is lower than that which exists in the marine environment in which said source is submerged, (c) means including said piston defining a mass-spring system having a resonant period at least as short as the shortest interval between said pulses in said train, (d) said piston having a driving shaft which extends along the central axis of said piston to enter a chamber in said housing in which chamber hydraulic fluid pressures can be applied to said shaft to move the piston between said inward and said outward positions against the ambient pressure of said marine environment, (e) a channel in communication with said chamber, (f) means providing pressurized hydraulic fluid at supply and return pressures, (g) an electrically-controlled hydraulic valve in said channel communicating with said pressurized hydraulic fluid means for selectively connecting said chamber to said hydraulic supply or return pressures and for controlling the hydraulic fluid flow between said fluid pressure means and said chamber, (h) means for operating said valve first to apply supply pressure to said chamber to produce forces on said shaft to move said piston to said outward position, second, and upon a first of said commands, to switch the pressure in said chamber abruptly toward return pressure and to control the flow through said valve as said piston moves inwardly from said outward position so that rebound of said piston off said spring system at said inward position occurs at a prescribed time corresponding to a pulse of said train, third, to switch the pressure in said chamber toward supply pressure during the interval when said piston is in the vicinity of said inward position and while piston velocity is near zero thereby to assist piston rebound, fourth, to switch the pressure in said cavity to return at a predetermined time to decelerate the piston so that the piston approaches its outward position with piston velocity simultaneously approaching zero, and fifth, to switch cavity pressure to supply to hold the piston in its outward position until the next of said commands.

2. The invention as set forth in claim 1 wherein a pair of said pistons are provided which are movable away from each other to said outward position and toward each other to said inward position, said sleeve being disposed around and in sliding relationship with said pair of pistons, said region being bounded on opposite sides by the opposed faces of different ones of said pair of pistons, said pair of pistons being included in said means defining said mass-spring system, a pair of said driving shafts each associated with a different one of said pistons, said chamber being at least one chamber into which said pair of shafts extend and in which said hydraulic fluid pressure can be applied simultaneously to said pair of shafts to move said pair of pistons simultaneously between said inward and outward positions.

3. The invention as set forth in claim 1 wherein said valve operating means includes means for detecting when said piston reaches said inward position for timing the switching of said pressure in said chamber.

4. The invention as set forth in claim 3 wherein said detecting means includes means responsive to the acceleration of said pistons.

5. The invention as set forth in claim 4 wherein said acceleration detecting means comprises an underwater transducer for providing an output signal in response to said acoustic pulses.

6. The invention as set forth in claim 1 wherein said electrically controlled hydraulic valve includes a power stage valve and an electrically operated pilot valve, said power stage valve having control chambers, and means connecting said pilot valve to said control chambers for selectively closing off and communicating said hydraulic fluid at supply and return pressures to said control chambers for actuating said power stage valve.

7. The invention as set forth in claim 1 wherein said valve operating means includes means responsive to the amplitude of said acoustic pulses for operating said electrically controlled hydraulic pilot valve to control the flow out of said chamber for controlling the inward acceleration of said piston and thereby controlling the amplitude and timing of said pulses.

8. The invention as set forth in claim 2 wherein said chamber is defined by an axial bore in the shaft of one of said pair of pistons, said bore being closed at its outward end, the shaft of the other of said pair of pistons being a piston rod slidably disposed in said bore and extending inwardly into engagement with said other of said pair of pistons, and the outward end of said rod, said outward end of said bore and the inner periphery of said bore providing said chamber.

9. The invention as set forth in claim 8 wherein said piston rod is integral with said other of said pair of pistons.

10. The invention as set forth in claim 8 wherein said housing has a circular groove forming a gallery which extends axially along said chamber, said shaft of said one of said pair of pistons having a radial passage which continuously communicates said chamber with said gallery as said shaft slides axially in said housing, and said channel being connected to said gallery.

11. A hydroacoustic source operative when submerged in a marine environment for generating upon successive commands acoustic pulses of controlled amplitude and spectral shape in a precisely timed train of pulses, said source comprising
   (a) at least one piston having an outer surface exposed to said marine environment and moveable in opposite directions between an inward and an outward position, for generating successive pulses of said train when said piston reaches said inward position.
   (b) a housing having a sleeve disposed around the circumference of said piston and in a sliding relationship therewith to define a region, bounded partially by the inner surfaces of said piston and said sleeve, which region is initially at a pressure which is lower than that which exists in the marine environment in which said source is submerged,
   (c) means including said piston defining a mass-spring system having a resonant period at least as short as the shortest interval between said pulses in said train,
   (d) said piston having a driving shaft which extends along the central axis of said piston to enter a chamber in said housing in which chamber hydraulic fluid pressures can be applied to said shaft to move the piston between said inward and said outward positions against the ambient pressure of said marine environment,
   (e) a channel in communication with said chamber,
   (f) means providing pressurized hydraulic fluid at first, second and third pressures, said first pressure being higher than said second pressure and said second pressure being higher than said third pressure,
   (g) an electrically-controlled hydraulic valve in said channel communicating with said pressurized hydraulic fluid means for selectively connecting said chamber to said first, second, and third pressures, and for controlling the hydraulic fluid flow between said fluid pressure means and said chamber,
   (h) means for operating said valve to (i) apply said first pressure to said chamber to produce forces on said shaft to move said piston to said outward position, (ii) upon a first of said commands, to switch the pressure in said chamber abruptly toward said third pressure and to control the flow through said valve as said piston moves inwardly from said outward position so that rebound of said piston off said spring system at said inward position occurs at a prescribed time corresponding to a pulse of said train, (iii) to switch the pressure in said chamber to said second pressure during the interval when said piston is in the vicinity of said inward position and while piston velocity is near zero thereby to assist piston rebound, said second pressure being of a magnitude to cause the rebound trajectory of the piston displacement to reach said outward position as said piston decelerates to zero velocity, and (iv) to switch the pressure in said chamber to said first pressure to hold the piston in its outward position until the next of said commands.

12. The invention as set forth in claim 11 wherein a pair of said pistons are provided which are movable away from each other to said outward position and toward each other to said inward position, said sleeve being disposed around and in sliding relationship with said pair of pistons, said region being bounded on opposite sides by the opposed faces of different ones of said pair of pistons, said pair of pistons being included in said means defining said mass-spring system, a pair of said driving shafts each associated with a different one of said pistons, said chamber being at least one chamber into which said pair of shafts extend and in which said hydraulic fluid pressure can be applied simultaneously to said pair of shafts to move said pair of pistons simultaneously between said inward and outward positions.

13. The invention as set forth in claim 11 wherein said valve operating means includes means for detecting when said piston reaches said inward position for timing the switching of said pressure in said chamber.

14. The invention as set forth in claim 13 wherein said detecting means includes means responsive to the acceleration of said pistons.

15. The invention as set forth in claim 14 wherein said acceleration detecting means comprises an underwater transducer for providing an output signal in response to said acoustic pulses.

16. The invention as set forth in claim 11 wherein said electrically controlled hydraulic valve includes a power stage valve and an electrically operated pilot valve, said power stage valve being disposed in said channel, said power stage valve having control chambers, and means connecting said pilot valve to said control chambers for selectively closing off and communicating said hydraulic fluid at supply and return pressures to said control chambers for actuating said power stage valve.

17. The invention as set forth in claim 11 wherein said valve operating means includes means responsive to the amplitude of said acoustic pulses for operating said electrically controlled hydraulic pilot valve to control the flow out of said chamber for controlling the inward acceleration of said piston and thereby controlling the amplitude and timing of said pulses.

18. The invention as set forth in claim 12 wherein said chamber is defined by an axial bore in the shaft of one of said pair of pistons, said bore being closed at its outward end, the shaft of the other of said pair of pistons being a piston rod slidably disposed in said bore and extending inwardly into engagement with said other of said pair of pistons, and the outward end of said rod, said outward end of said bore and the inner periphery of said bore providing said chamber.

19. The invention as set forth in claim 18 wherein said piston rod is integral with said other of said pair of pistons.

20. The invention as set forth in claim 19 wherein said housing has a circular groove forming a gallery which extends axially along said chamber, said shaft of said one of said pair of pistons having a radial passage which continuously communicates said chamber with said gallery as said shaft slides axially in said housing, and said channel being connected to said gallery.

21. The invention as set forth in claim 11 wherein said housing has a bore extending outwardly along said piston central axis, said piston driving shaft being disposed in said bore in sliding relationship with the inner periphery thereof, said chamber being disposed in said bore, said bore having first and second grooves in the inner periphery thereof, said second groove being spaced from said first groove in the direction towards said outward position, porting means on said shaft for communicating said chamber with said first groove and with said second groove successively as said piston moves toward said outward position, said communication with said second groove occuring when said piston reaches said outward position, means for continuously communicating said first pressure to said second groove, and said channel being in communication with said first groove.

22. The invention as set forth in claim 21 wherein a pair of said pistons are provided, one of said pistons being connected to said shaft, said shaft having a second bore, the other of said pistons having a second driving shaft which is slidably disposed in said second bore, said chamber being disposed in said second bore between the ends of said first named and second driving shafts said first shaft having a porting hole extending radially between said chamber and said first bore, said porting hole providing said porting means.

23. The invention as set forth in claim 11 wherein said valve is a three pressure selector spool valve for selectively communicating said hydraulic fluid at said third, second and first pressures to said channel in three successive positions of said valve, and said valve operating means actuates said spool valve to said three positions successively when said radiating piston moves inwardly from said outward position, when said radiating piston reaches said inward position, and when said radiating piston returns to said outward position.

24. A hydroacoustic source operative when submerged in a marine environment for generating upon successive commands acoustic pulses of controlled amplitude and spectral shape in a precisely timed train of pulses, said source comprising
(a) at least one piston having an outer surface exposed to said marine environment and moveable in opposite directions between an inward and an outward position, for generating successive pulses of said train when said piston reaches said inward position,
(c) a housing having a sleeve disposed around the circumference of said piston and in a sliding relationship therewith to define a region, bounded partially by the inner surfaces of said piston and said sleeve, which region is initially at a pressure which is lower than that which exists in the marine environment in which said source is submerged,
(d) means including said piston defining a mass-spring system having a resonant period at least as short as the shortest interval between said pulses in said train,
(e) said piston having a driving shaft which extends along the central axis of said piston to enter a chamber in said housing in which chamber hydraulic fluid pressures can be applied to said shaft to move the piston between said inward and said outward positions against the ambient pressure of said marine environment,
(f) a channel in communication with said chamber,
(g) means providing pressurized hydraulic fluid at supply and return pressures,
(h) an electrically-controlled hydraulic valve in said channel communicating with said pressurized hydraulic fluid means for selectively connecting said chamber to said hydraulic supply or return pressures and for controlling the hydraulic fluid flow between said fluid pressure means and said chamber, and
(i) means for the operating said valve first to apply supply pressure to said chamber to produce forces on said shaft to move said piston to said outward position, second, and upon command, to switch the pressure in said chamber abruptly toward return pressure and to control the flow through said valve as said piston moves inwardly from said outward position so that rebound of said piston off said spring system at said inward position occurs at a prescribed time corresponding to a pulse of said train, third, to switch the pressure in said chamber toward supply pressure at the completion of said piston rebound, and to control the subsequent flow through said valve so that the piston approaches its outward position with piston velocity simultaneously approaching zero velocity.

25. The invention as set forth in claim 24 wherein a pair of said pistons are provided which are movable away from each other to said outward position and toward each other to said inward position, said sleeve being disposed around and in sliding relationship with said pair of pistons, said region being bounded on opposite sides by the opposed faces of different ones of said pair of pistons, said pair of pistons being included in said means defining said mass-spring system, a pair of said driving shafts each associated with a different one of said pistons, said chamber being at least one chamber into which said pair of shafts extend and in which said hydraulic fluid pressure can be applied simultaneously to said pair of shafts to move said pair of pistons simultaneously between said inward and outward positions.

26. The invention as set forth in claim 24 wherein said valve operating means includes means for detecting when said piston reaches said inward position for timing the switching of said pressure in said chamber.

27. The invention as set forth in claim 26 wherein said detecting means includes means responsive to the acceleration of said pistons.

28. The invention as set forth in claim 27 wherein said acceleration detecting means comprises an underwater transducer for providing an output signal in response to said acoustic pulses.

29. The invention as set forth in claim 24 wherein said electrically controlled hydraulic valve includes a power stage valve and an electrically operated pilot valve, said power stage valve being disposed in said channel, said power stage valve having control chambers, and means connecting said pilot valve to said control chambers for selectively closing off and communicating said hydraulic fluid at supply and return pressures to said control chambers for actuating said power stage valve.

30. The invention as set forth in claim 24 wherein said valve operating means includes means responsive to the amplitude of said acoustic pulses for operating said electrically controlled hydraulic pilot valve to control the flow out of said chamber for controlling the inward acceleration of said piston and thereby controlling the amplitude and timing of said pulses.

31. The invention as set forth in claim 25 wherein said chamber is defined by an axial bore in the shaft of one of said pair of pistons, said bore being closed at its outward end, the shaft of the other of said pair of pistons being a piston rod slidably disposed in said bore and extending inwardly into engagement with said other of said pair of pistons, and the outward end of said rod, said outward end of said bore and the inner periphery of said bore providing said chamber.

32. The invention as set forth in claim 31 wherein said piston rod is integral with said other of said pair of pistons.

33. The invention as set forth in claim 31 wherein said housing has a circular groove forming a gallery which extends axially along said chamber, said shaft of said one of said pair of pistons having a radial passage which continuously communicates said chamber with said gallery as said shaft slides axially in said housing, and said channel being connected to said gallery.

34. A hydroacoustic source operative when submerged in a marine environment which comprises
(a) a pair of acoustic energy radiating pistons disposed in back-to-back relationship,
(b) a sleeve disposed around the circumference of said pistons, to define a region initially at pressure lower than that which exists in the marine environment in which said source is submerged, said pistons being in sliding relationship with said sleeve for movement inwardly toward each other and outwardly away from each other to generate an acoustic pulse when they reach an impact position adjacent to each other,
(c) a pair of web members attached to said sleeve and extending outwardly from opposite ends of said sleeve and radially across said sleeve ends,
(d) each piston of said pair of pistons having a separate shaft extending outwardly therefrom, said shafts being received in a different one of said web members in sliding relationship therewith,
(e) one of said shafts having a bore which is closed at the outward end of said shaft and open at the inward end of said shaft,
(f) a rod slidably disposed in said bore and extending, through the back of the one of said pair of pistons which is attached to said one shaft, to the back of the other of said pair of pistons,
(g) said rod and said bore defining a chamber,
(h) a channel in communication with said chamber,
(i) means providing pressurized hydraulic fluid at supply and return pressures,
(j) a hydraulically controllable power stage valve in said channel for switching hydraulic fluid at said supply and return pressures from said pressurized hydraulic fluid providing means selectively to said chamber, and
(k) control valve means operative in response to command signals for controlling said power stage valve to first switch said chamber (i) to receive pressurized fluid at supply pressure so as to apply forces on said pistons against the forces due to the pressure in said marine environment to move said pistons away from each other to an outward position; (ii) next to reduce the pressure in said chamber toward said return pressure so as to permit said pistons to accelerate inwardly toward each other under the forces due to the pressure in said marine environment to return to said impact position from which inward position said pistons rebound from each other; and (iii) then switch said chamber to said supply pressure to assist said rebound and to hold said pistons in said outward position thereof.

35. The invention as set forth in claim 34 further comprising means for detecting when said pistons reach zero velocity upon their movement toward each other for operating said control valve to cause said power valve to switch said chamber from return to supply pressure a predetermined time after the time when zero velocity is reached.

36. The invention as set forth in claim 34 further comprising means for detecting when said pistons reach zero velocity upon their movement inwardly toward each other for operating said control valve to cause said power valve to switch said chamber from return to supply for a predetermined period of time commencing after zero velocity is reached and terminating before said pistons reach said outward position and then to switch said chamber back to return pressure, said control valve being operative to cause said power valve to switch said chamber to supply pressure when said pistons reach said outward position.

37. The invention as set forth in claim 34 wherein said rod is free to move in said bore.

38. The invention as set forth in claim 34 wherein said pistons are flexural members which move into impact relationship with each other at the end of their inward movement toward each other and thereafter spring outwardly and rebound from each other.

39. The invention as set forth in claim 38 wherein the faces of said pistons which are opposed to each other are convex so as to impact near the centers thereof and flex toward each other along the outer periphery thereof upon impact.

40. The invention as set forth in claim 38 wherein the faces of said pistons which are opposed to each other are concave so as to impact along the outer peripheries thereof and flex near the centers thereof upon impact.

41. The invention as set forth in claim 34 further comprising supply and return accumulators respectively in communication with the ports of said power valve which switch said channel to the supply pressure and return pressure providing sides of said pressurized hydraulic fluid providing means.

* * * * *